US009609510B2

(12) United States Patent
Raleigh et al.

(10) Patent No.: US 9,609,510 B2
(45) Date of Patent: Mar. 28, 2017

(54) AUTOMATED CREDENTIAL PORTING FOR MOBILE DEVICES

(71) Applicant: Headwater Partners I LLC, Redwood Shores, CA (US)

(72) Inventors: Gregory G. Raleigh, Woodside, CA (US); James Lavine, Corte Madera, CA (US)

(73) Assignee: Headwater Research LLC, Tyler, TX (US)

( * ) Notice: Subject to any disclaimer, the term of this patent is extended or adjusted under 35 U.S.C. 154(b) by 364 days.

(21) Appl. No.: 14/208,236

(22) Filed: Mar. 13, 2014

(65) Prior Publication Data

US 2014/0273965 A1    Sep. 18, 2014

Related U.S. Application Data

(60) Provisional application No. 61/785,988, filed on Mar. 14, 2013.

(51) Int. Cl.
*H04M 1/66* (2006.01)
*H04W 12/04* (2009.01)
(Continued)

(52) U.S. Cl.
CPC ........... *H04W 12/04* (2013.01); *H04L 63/062* (2013.01); *H04W 12/06* (2013.01)

(58) Field of Classification Search
CPC ..... H04W 12/06; H04W 12/08; H04W 12/12; H04L 63/08
(Continued)

(56) References Cited

U.S. PATENT DOCUMENTS

| 5,131,020 A | 7/1992 | Liebesny et al. |
| 5,283,904 A | 2/1994 | Carson et al. |

(Continued)

FOREIGN PATENT DOCUMENTS

| CA | 2688553 A1 | 12/2008 |
| CN | 1310401 A | 8/2001 |

(Continued)

OTHER PUBLICATIONS

VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.

(Continued)

*Primary Examiner* — Andrew Joseph Rudy
(74) *Attorney, Agent, or Firm* — James E. Harris

(57) ABSTRACT

Devices, systems, and non-transitory computer-readable storage media for updating wireless device credentials, the wireless device comprising: a user interface, memory configured to store one or more credentials for enabling the wireless device to obtain one or more services over a wireless access network, and one or more processors configured to execute one or more machine-executable instructions that, when executed by the one or more processors, cause the one or more processors to obtain an indication of a user request to replace a particular credential with a target credential, detect a network-provisioning state change, determine that the particular credential does not match the target credential, initiate a programming session with a network element over a wireless access network, obtain an updated credential from the network element, and assist in storing the updated credential in memory.

48 Claims, 16 Drawing Sheets

(51) Int. Cl.
*H04L 29/06* (2006.01)
*H04W 12/06* (2009.01)

(58) Field of Classification Search
USPC .......... 455/405, 406, 411, 414.1, 432.1, 437
See application file for complete search history.

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,226,277 B1 | 5/2001 | Chuah |
| 6,263,055 B1 | 7/2001 | Garland et al. |
| 6,292,828 B1 | 9/2001 | Williams |
| 6,317,584 B1 | 11/2001 | Abu-Amara et al. |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,532,235 B1 | 3/2003 | Benson et al. |
| 6,532,579 B2 | 3/2003 | Sato et al. |
| 6,535,855 B1 | 3/2003 | Cahill et al. |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama et al. |
| 6,598,034 B1 | 7/2003 | Kloth |
| 6,601,040 B1 | 7/2003 | Kolls |
| 6,603,969 B1 | 8/2003 | Vuoristo et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,393 B2 * | 10/2005 | Hollis ................. H04L 63/0272 709/223 |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,982,733 B1 | 1/2006 | McNally et al. |
| 6,983,370 B2 | 1/2006 | Eaton et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,032,072 B1 | 4/2006 | Quinn et al. |
| 7,039,027 B2 | 5/2006 | Bridgelall |
| 7,039,037 B2 | 5/2006 | Wang et al. |

(56) References Cited

U.S. PATENT DOCUMENTS

| | | | |
|---|---|---|---|
| 7,039,403 | B2 | 5/2006 | Wong |
| 7,039,713 | B1 | 5/2006 | Van Gunter et al. |
| 7,042,988 | B2 | 5/2006 | Juitt et al. |
| 7,043,225 | B1 | 5/2006 | Patel et al. |
| 7,043,226 | B2 | 5/2006 | Yamauchi |
| 7,043,268 | B2 | 5/2006 | Yukie et al. |
| 7,047,276 | B2 | 5/2006 | Liu et al. |
| 7,058,022 | B1 | 6/2006 | Carolan et al. |
| 7,058,968 | B2 | 6/2006 | Rowland et al. |
| 7,068,600 | B2 | 6/2006 | Cain |
| 7,069,248 | B2 | 6/2006 | Huber |
| 7,082,422 | B1 | 7/2006 | Zirngibl et al. |
| 7,084,775 | B1 | 8/2006 | Smith |
| 7,092,696 | B1 | 8/2006 | Hosain et al. |
| 7,095,754 | B2 | 8/2006 | Benveniste |
| 7,102,620 | B2 | 9/2006 | Harries et al. |
| 7,110,753 | B2 | 9/2006 | Campen |
| 7,113,780 | B2 | 9/2006 | McKenna et al. |
| 7,113,997 | B2 | 9/2006 | Jayapalan et al. |
| 7,133,386 | B2 | 11/2006 | Holur et al. |
| 7,133,695 | B2 | 11/2006 | Beyda |
| 7,136,361 | B2 | 11/2006 | Benveniste |
| 7,139,569 | B2 | 11/2006 | Kato |
| 7,142,876 | B2 | 11/2006 | Trossen et al. |
| 7,149,229 | B1 | 12/2006 | Leung |
| 7,149,521 | B2 | 12/2006 | Sundar et al. |
| 7,151,764 | B1 | 12/2006 | Heinonen et al. |
| 7,158,792 | B1 | 1/2007 | Cook et al. |
| 7,162,237 | B1 | 1/2007 | Silver et al. |
| 7,167,078 | B2 | 1/2007 | Pourchot |
| 7,174,156 | B1 | 2/2007 | Mangal |
| 7,174,174 | B2 | 2/2007 | Boris et al. |
| 7,177,919 | B1 * | 2/2007 | Truong ............... H04L 49/602 709/220 |
| 7,180,855 | B1 | 2/2007 | Lin |
| 7,181,017 | B1 | 2/2007 | Nagel et al. |
| 7,191,248 | B2 | 3/2007 | Chattopadhyay et al. |
| 7,197,321 | B2 | 3/2007 | Erskine et al. |
| 7,200,112 | B2 | 4/2007 | Sundar et al. |
| 7,203,169 | B1 | 4/2007 | Okholm et al. |
| 7,203,721 | B1 | 4/2007 | Ben-Efraim et al. |
| 7,203,752 | B2 | 4/2007 | Rice et al. |
| 7,212,491 | B2 | 5/2007 | Koga |
| 7,219,123 | B1 | 5/2007 | Fiechter et al. |
| 7,222,190 | B2 | 5/2007 | Klinker et al. |
| 7,222,304 | B2 | 5/2007 | Beaton et al. |
| 7,224,968 | B2 | 5/2007 | Dobson et al. |
| 7,228,354 | B2 | 6/2007 | Chambliss et al. |
| 7,236,780 | B2 | 6/2007 | Benco |
| 7,242,668 | B2 | 7/2007 | Kan et al. |
| 7,242,920 | B2 | 7/2007 | Morris |
| 7,245,901 | B2 | 7/2007 | McGregor et al. |
| 7,248,570 | B2 | 7/2007 | Bahl et al. |
| 7,251,218 | B2 | 7/2007 | Jorgensen |
| 7,260,382 | B2 | 8/2007 | Lamb et al. |
| 7,266,371 | B1 | 9/2007 | Amin et al. |
| 7,271,765 | B2 | 9/2007 | Stilp et al. |
| 7,272,660 | B1 | 9/2007 | Powers et al. |
| 7,280,816 | B2 | 10/2007 | Fratti et al. |
| 7,280,818 | B2 | 10/2007 | Clayton |
| 7,283,561 | B1 | 10/2007 | Picher-Dempsey |
| 7,283,963 | B1 | 10/2007 | Fitzpatrick et al. |
| 7,286,834 | B2 | 10/2007 | Walter |
| 7,286,848 | B2 | 10/2007 | Vireday et al. |
| 7,289,489 | B1 | 10/2007 | Kung et al. |
| 7,290,283 | B2 | 10/2007 | Copeland, III |
| 7,310,424 | B2 | 12/2007 | Gehring et al. |
| 7,313,237 | B2 | 12/2007 | Bahl et al. |
| 7,317,699 | B2 | 1/2008 | Godfrey et al. |
| 7,318,111 | B2 | 1/2008 | Zhao |
| 7,320,029 | B2 | 1/2008 | Rinne et al. |
| 7,322,044 | B2 | 1/2008 | Hrastar |
| 7,324,447 | B1 | 1/2008 | Morford |
| 7,325,037 | B2 | 1/2008 | Lawson |
| 7,336,960 | B2 | 2/2008 | Zavalkovsky et al. |
| 7,346,410 | B2 | 3/2008 | Uchiyama |
| 7,349,695 | B2 | 3/2008 | Oommen et al. |
| 7,353,533 | B2 | 4/2008 | Wright et al. |
| 7,356,011 | B1 | 4/2008 | Waters et al. |
| 7,356,337 | B2 | 4/2008 | Florence |
| 7,366,497 | B2 | 4/2008 | Nagata |
| 7,366,654 | B2 | 4/2008 | Moore |
| 7,369,848 | B2 | 5/2008 | Jiang |
| 7,369,856 | B2 * | 5/2008 | Ovadia ............... H04L 41/0213 455/437 |
| 7,373,136 | B2 | 5/2008 | Watler et al. |
| 7,373,179 | B2 | 5/2008 | Stine et al. |
| 7,379,731 | B2 | 5/2008 | Natsuno et al. |
| 7,388,950 | B2 | 6/2008 | Elsey et al. |
| 7,389,412 | B2 | 6/2008 | Sharma et al. |
| 7,391,724 | B2 | 6/2008 | Alakoski et al. |
| 7,395,244 | B1 | 7/2008 | Kingsford |
| 7,401,338 | B1 | 7/2008 | Bowen et al. |
| 7,403,763 | B2 | 7/2008 | Maes |
| 7,409,447 | B1 | 8/2008 | Assadzadeh |
| 7,409,569 | B2 | 8/2008 | Illowsky et al. |
| 7,411,930 | B2 | 8/2008 | Montojo et al. |
| 7,418,253 | B2 | 8/2008 | Kavanah |
| 7,418,257 | B2 | 8/2008 | Kim |
| 7,421,004 | B2 | 9/2008 | Feher |
| 7,428,750 | B1 * | 9/2008 | Dunn .................... G06F 21/41 726/8 |
| 7,440,433 | B2 | 10/2008 | Rink et al. |
| 7,444,669 | B1 | 10/2008 | Bahl et al. |
| 7,450,591 | B2 | 11/2008 | Korling et al. |
| 7,450,927 | B1 | 11/2008 | Creswell et al. |
| 7,454,191 | B2 | 11/2008 | Dawson et al. |
| 7,457,265 | B2 | 11/2008 | Julka et al. |
| 7,457,870 | B1 | 11/2008 | Lownsbrough et al. |
| 7,460,837 | B2 | 12/2008 | Diener |
| 7,466,652 | B2 | 12/2008 | Lau et al. |
| 7,472,189 | B2 | 12/2008 | Mallya et al. |
| 7,478,420 | B2 | 1/2009 | Wright et al. |
| 7,486,185 | B2 | 2/2009 | Culpepper et al. |
| 7,486,658 | B2 | 2/2009 | Kumar |
| 7,493,659 | B1 | 2/2009 | Wu et al. |
| 7,496,652 | B2 | 2/2009 | Pezzutti |
| 7,499,438 | B2 | 3/2009 | Hinman et al. |
| 7,499,537 | B2 | 3/2009 | Elsey et al. |
| 7,502,672 | B1 | 3/2009 | Kolls |
| 7,505,795 | B1 | 3/2009 | Lim et al. |
| 7,508,799 | B2 | 3/2009 | Sumner et al. |
| 7,512,128 | B2 | 3/2009 | DiMambro et al. |
| 7,512,131 | B2 | 3/2009 | Svensson et al. |
| 7,515,608 | B2 | 4/2009 | Yuan et al. |
| 7,515,926 | B2 | 4/2009 | Bu et al. |
| 7,516,219 | B2 | 4/2009 | Moghaddam et al. |
| 7,526,541 | B2 | 4/2009 | Roese et al. |
| 7,529,204 | B2 | 5/2009 | Bourlas et al. |
| 7,535,880 | B1 | 5/2009 | Hinman et al. |
| 7,536,695 | B2 | 5/2009 | Alam et al. |
| 7,539,132 | B2 | 5/2009 | Werner et al. |
| 7,540,408 | B2 | 6/2009 | Levine et al. |
| 7,545,782 | B2 | 6/2009 | Rayment et al. |
| 7,546,460 | B2 | 6/2009 | Maes |
| 7,546,629 | B2 | 6/2009 | Albert et al. |
| 7,548,976 | B2 | 6/2009 | Bahl et al. |
| 7,551,922 | B2 | 6/2009 | Roskowski et al. |
| 7,554,983 | B1 | 6/2009 | Muppala |
| 7,555,757 | B2 | 6/2009 | Smith et al. |
| 7,561,899 | B2 | 7/2009 | Lee |
| 7,562,213 | B1 | 7/2009 | Timms |
| 7,564,799 | B2 | 7/2009 | Holland et al. |
| 7,565,141 | B2 | 7/2009 | Macaluso |
| 7,574,509 | B2 | 8/2009 | Nixon et al. |
| 7,574,731 | B2 | 8/2009 | Fascenda |
| 7,577,431 | B2 | 8/2009 | Jiang |
| 7,580,356 | B1 | 8/2009 | Mishra et al. |
| 7,580,857 | B2 | 8/2009 | VanFleet et al. |
| 7,583,964 | B2 | 9/2009 | Wong |
| 7,586,871 | B2 | 9/2009 | Hamilton et al. |
| 7,593,417 | B2 | 9/2009 | Wang et al. |
| 7,593,730 | B2 | 9/2009 | Khandelwal et al. |
| 7,599,288 | B2 | 10/2009 | Cole et al. |

(56) References Cited

U.S. PATENT DOCUMENTS

| | | |
|---|---|---|
| 7,599,714 B2 | 10/2009 | Kuzminskiy |
| 7,602,746 B2 | 10/2009 | Calhoun et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,676,673 B2 | 3/2010 | Weller et al. |
| 7,680,086 B2 | 3/2010 | Eglin |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,770,785 B2 | 8/2010 | Jha et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,606 B2 | 9/2010 | Birger et al. |
| 7,809,351 B1 | 10/2010 | Panda et al. |
| 7,817,615 B1 | 10/2010 | Breau et al. |
| 7,817,983 B2 | 10/2010 | Cassett et al. |
| 7,822,837 B1 | 10/2010 | Urban et al. |
| 7,826,427 B2 | 11/2010 | Sood et al. |
| 7,826,607 B1 | 11/2010 | de Carvalho Resende et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,477 B2 | 12/2010 | Cristofalo et al. |
| 7,853,255 B2 | 12/2010 | Karaoguz et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman et al. |

(56) References Cited

U.S. PATENT DOCUMENTS

| | | |
|---|---|---|
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,463 B1 | 11/2011 | Spiegel |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,616 B2 | 1/2012 | Proctor, Jr. et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |

(56) References Cited

U.S. PATENT DOCUMENTS

| | | |
|---|---|---|
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,238,287 B1 | 8/2012 | Gopi et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 | 11/2012 | Gailloux |
| 8,307,067 B2 | 11/2012 | Ryan |
| 8,307,095 B2 | 11/2012 | Clark et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour |
| 8,386,386 B1 | 2/2013 | Zhu |
| 8,391,262 B2 | 3/2013 | Maki et al. |
| 8,391,834 B2 | 3/2013 | Raleigh |
| 8,396,458 B2 | 3/2013 | Raleigh |
| 8,396,929 B2 | 3/2013 | Helfman et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,472 B2 * | 3/2013 | Hao ............... H04L 9/0827 |
| | | 455/456.1 |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,429,409 B1 | 4/2013 | Wall et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,461,958 B2 | 6/2013 | Saenz et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| RE44,412 E | 8/2013 | Naqvi et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,687 B2 | 8/2013 | Maffione et al. |
| 8,504,690 B2 | 8/2013 | Shah et al. |
| 8,504,729 B2 | 8/2013 | Pezzutti |

(56) References Cited

U.S. PATENT DOCUMENTS

| | | | |
|---|---|---|---|
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,532,610 B2 | 9/2013 | Manning Cassett et al. |
| 8,533,775 B2 | 9/2013 | Alcorn et al. |
| 8,538,394 B2 | 9/2013 | Zimmerman et al. |
| 8,538,402 B2 | 9/2013 | Vidal et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2* | 9/2013 | Laitinen ............... H04L 9/0838 713/155 |
| 8,544,105 B2 | 9/2013 | Mclean et al. |
| 8,548,427 B2 | 10/2013 | Chow et al. |
| 8,548,428 B2 | 10/2013 | Raleigh |
| 8,554,876 B2 | 10/2013 | Winsor |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,589,541 B2 | 11/2013 | Raleigh et al. |
| 8,589,955 B2 | 11/2013 | Roundtree et al. |
| 8,600,895 B2 | 12/2013 | Felsher |
| 8,601,125 B2 | 12/2013 | Huang et al. |
| 8,605,691 B2 | 12/2013 | Soomro et al. |
| 8,621,056 B2 | 12/2013 | Coussemaeker et al. |
| 8,626,115 B2 | 1/2014 | Raleigh et al. |
| 8,630,314 B2 | 1/2014 | York |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,852 B2 | 3/2014 | Maes |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2* | 4/2014 | Dua ....................... G06Q 20/20 705/64 |
| 8,701,015 B2 | 4/2014 | Bonnat |
| 8,705,361 B2 | 4/2014 | Venkataraman et al. |
| 8,706,863 B2 | 4/2014 | Fadell |
| 8,712,631 B2 | 4/2014 | Tietjen et al. |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,739,287 B1 | 5/2014 | Polyakov et al. |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,793,304 B2 | 7/2014 | Lu et al. |
| 8,799,227 B2 | 8/2014 | Ferguson et al. |
| 8,804,517 B2 | 8/2014 | Oerton |
| 8,811,338 B2 | 8/2014 | Jin et al. |
| 8,811,991 B2 | 8/2014 | Jain et al. |
| 8,812,525 B1 | 8/2014 | Taylor, III |
| 8,819,253 B2 | 8/2014 | Simeloff et al. |
| 8,825,109 B2 | 9/2014 | Montemurro et al. |
| 8,831,561 B2 | 9/2014 | Sutaria et al. |
| 8,837,322 B2 | 9/2014 | Venkataramanan et al. |
| 8,838,686 B2 | 9/2014 | Getchius |
| 8,838,752 B2 | 9/2014 | Lor et al. |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,868,725 B2 | 10/2014 | Samba |
| 8,875,042 B2 | 10/2014 | LeJeune et al. |
| 8,880,047 B2 | 11/2014 | Konicek et al. |
| 8,898,748 B2 | 11/2014 | Burks et al. |
| 8,908,516 B2 | 12/2014 | Tzamaloukas et al. |
| 8,930,238 B2 | 1/2015 | Coffman et al. |
| 8,943,551 B2* | 1/2015 | Ganapathy ............ H04W 12/06 713/155 |
| 8,948,726 B2 | 2/2015 | Smith et al. |
| 8,949,597 B1 | 2/2015 | Reeves et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,972,537 B2 | 3/2015 | Bastian et al. |
| 8,977,284 B2 | 3/2015 | Reed |
| 8,977,856 B2* | 3/2015 | Malek ................... H04W 12/04 713/171 |
| 8,983,860 B1 | 3/2015 | Beda, III et al. |
| 8,995,952 B1 | 3/2015 | Baker et al. |
| 9,002,322 B2 | 4/2015 | Cotterill |
| 9,002,342 B2 | 4/2015 | Tenhunen et al. |
| 9,014,973 B2 | 4/2015 | Ruckart |
| 9,021,069 B2 | 4/2015 | Ducrou et al. |
| 9,030,934 B2 | 5/2015 | Shah et al. |
| 9,032,427 B2 | 5/2015 | Gallant et al. |
| 9,043,462 B2 | 5/2015 | Badiee et al. |
| 9,047,651 B2 | 6/2015 | Roumeliotis et al. |
| 9,049,010 B2 | 6/2015 | Jueneman et al. |
| 9,111,088 B2 | 8/2015 | Ghai et al. |
| 9,135,037 B1 | 9/2015 | Petrescu-Prahova et al. |
| 9,137,389 B2 | 9/2015 | Neal et al. |
| 9,172,553 B2 | 10/2015 | Dawes et al. |
| 9,173,090 B2 | 10/2015 | Tuchman et al. |
| 9,176,913 B2 | 11/2015 | Millet et al. |
| 9,177,455 B2 | 11/2015 | Remer |
| 9,191,394 B2* | 11/2015 | Novak .................. H04L 63/102 |
| 9,282,460 B2 | 3/2016 | Souissi |
| 9,298,723 B1 | 3/2016 | Vincent |
| 9,325,737 B2 | 4/2016 | Gutowski et al. |
| 9,326,173 B2 | 4/2016 | Luft |
| 9,344,557 B2 | 5/2016 | Gruchala et al. |
| 9,361,451 B2* | 6/2016 | Oberheide ............. G06F 21/34 |
| 9,367,680 B2 | 6/2016 | Mahaffey et al. |
| 9,369,959 B2 | 6/2016 | Ruutu et al. |
| 9,386,045 B2* | 7/2016 | Kgil ...................... H04L 63/205 |
| 9,392,462 B2* | 7/2016 | Raleigh ................. H04W 12/08 |
| 9,413,546 B2* | 8/2016 | Meier ..................... H04L 12/24 |
| 2002/0120370 A1 | 8/2002 | Parupudi et al. |
| 2002/0138599 A1 | 9/2002 | Dilman et al. |
| 2002/0154751 A1 | 10/2002 | Thompson et al. |
| 2002/0188732 A1 | 12/2002 | Buckman et al. |
| 2002/0191573 A1 | 12/2002 | Whitehill et al. |
| 2003/0028623 A1 | 2/2003 | Hennessey et al. |

(56) References Cited

U.S. PATENT DOCUMENTS

| | | |
|---|---|---|
| 2003/0084321 A1 | 5/2003 | Tarquini et al. |
| 2003/0134650 A1 | 7/2003 | Sundar et al. |
| 2003/0159030 A1 | 8/2003 | Evans |
| 2003/0184793 A1 | 10/2003 | Pineau |
| 2003/0188006 A1 | 10/2003 | Bard |
| 2004/0039792 A1 | 2/2004 | Nakanishi |
| 2004/0054779 A1 | 3/2004 | Takeshima et al. |
| 2004/0127208 A1 | 7/2004 | Nair et al. |
| 2004/0133668 A1 | 7/2004 | Nicholas, III |
| 2004/0137890 A1 | 7/2004 | Kalke |
| 2004/0170191 A1 | 9/2004 | Guo et al. |
| 2004/0176104 A1 | 9/2004 | Arcens |
| 2004/0203833 A1 | 10/2004 | Rathunde et al. |
| 2004/0225561 A1 | 11/2004 | Hertzberg et al. |
| 2004/0243680 A1 | 12/2004 | Mayer |
| 2004/0243992 A1 | 12/2004 | Gustafson et al. |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0041617 A1 | 2/2005 | Huotari et al. |
| 2005/0060525 A1 | 3/2005 | Schwartz et al. |
| 2005/0075115 A1 | 4/2005 | Corneille et al. |
| 2005/0091505 A1 | 4/2005 | Riley et al. |
| 2005/0096024 A1 | 5/2005 | Bicker et al. |
| 2005/0108075 A1 | 5/2005 | Douglis et al. |
| 2005/0135264 A1 | 6/2005 | Popoff et al. |
| 2005/0163320 A1 | 7/2005 | Brown et al. |
| 2005/0186948 A1 | 8/2005 | Gallagher et al. |
| 2005/0239447 A1 | 10/2005 | Holzman et al. |
| 2005/0245241 A1 | 11/2005 | Durand et al. |
| 2005/0250536 A1 | 11/2005 | Deng et al. |
| 2006/0030306 A1 | 2/2006 | Kuhn |
| 2006/0035631 A1 | 2/2006 | White et al. |
| 2006/0072451 A1 | 4/2006 | Ross |
| 2006/0075506 A1 | 4/2006 | Sanda et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0114821 A1 | 6/2006 | Willey et al. |
| 2006/0126562 A1 | 6/2006 | Liu |
| 2006/0136882 A1 | 6/2006 | Noonan et al. |
| 2006/0143066 A1 | 6/2006 | Calabria |
| 2006/0160536 A1 | 7/2006 | Chou |
| 2006/0168128 A1 | 7/2006 | Sistla et al. |
| 2006/0182137 A1 | 8/2006 | Zhou et al. |
| 2006/0200663 A1 | 9/2006 | Thornton |
| 2006/0206709 A1 | 9/2006 | Labrou et al. |
| 2006/0277590 A1 | 12/2006 | Limont et al. |
| 2006/0291419 A1 | 12/2006 | McConnell et al. |
| 2007/0005795 A1 | 1/2007 | Gonzalez |
| 2007/0060200 A1 | 3/2007 | Boris et al. |
| 2007/0061800 A1 | 3/2007 | Cheng et al. |
| 2007/0073899 A1 | 3/2007 | Judge et al. |
| 2007/0130283 A1 | 6/2007 | Klein et al. |
| 2007/0143824 A1 | 6/2007 | Shahbazi |
| 2007/0147317 A1 | 6/2007 | Smith et al. |
| 2007/0165630 A1 | 7/2007 | Rasanen et al. |
| 2007/0174490 A1 | 7/2007 | Choi et al. |
| 2007/0192460 A1 | 8/2007 | Choi et al. |
| 2007/0201502 A1 | 8/2007 | Abramson |
| 2007/0213054 A1 | 9/2007 | Han |
| 2007/0226775 A1 | 9/2007 | Andreasen et al. |
| 2007/0234402 A1 | 10/2007 | Khosravi et al. |
| 2007/0255769 A1 | 11/2007 | Agrawal et al. |
| 2007/0255797 A1 | 11/2007 | Dunn et al. |
| 2007/0257767 A1 | 11/2007 | Beeson |
| 2007/0259656 A1 | 11/2007 | Jeong |
| 2007/0266422 A1 | 11/2007 | Germano et al. |
| 2007/0293191 A1 | 12/2007 | Mir et al. |
| 2007/0294410 A1 | 12/2007 | Pandya et al. |
| 2007/0297378 A1 | 12/2007 | Poyhonen et al. |
| 2007/0299965 A1 | 12/2007 | Nieh et al. |
| 2008/0010379 A1 | 1/2008 | Zhao |
| 2008/0018494 A1 | 1/2008 | Waite et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0050715 A1 | 2/2008 | Golczewski et al. |
| 2008/0056273 A1 | 3/2008 | Pelletier et al. |
| 2008/0066181 A1 | 3/2008 | Haveson et al. |
| 2008/0080457 A1 | 4/2008 | Cole |
| 2008/0089303 A1 | 4/2008 | Wirtanen et al. |
| 2008/0096559 A1 | 4/2008 | Phillips et al. |
| 2008/0125079 A1 | 5/2008 | O'Neil et al. |
| 2008/0126287 A1 | 5/2008 | Cox et al. |
| 2008/0139210 A1 | 6/2008 | Gisby et al. |
| 2008/0166993 A1 | 7/2008 | Gautier et al. |
| 2008/0168275 A1 | 7/2008 | DeAtley et al. |
| 2008/0178300 A1 | 7/2008 | Brown et al. |
| 2008/0212751 A1 | 9/2008 | Chung |
| 2008/0263348 A1 | 10/2008 | Zaltsman et al. |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0293395 A1 | 11/2008 | Mathews et al. |
| 2008/0313315 A1 | 12/2008 | Karaoguz et al. |
| 2008/0320497 A1 | 12/2008 | Tarkoma et al. |
| 2009/0006229 A1 | 1/2009 | Sweeney et al. |
| 2009/0016310 A1 | 1/2009 | Rasal |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0065571 A1 | 3/2009 | Jain |
| 2009/0070379 A1 | 3/2009 | Rappaport |
| 2009/0132860 A1 | 5/2009 | Liu et al. |
| 2009/0163173 A1 | 6/2009 | Williams |
| 2009/0181662 A1 | 7/2009 | Fleischman et al. |
| 2009/0197612 A1 | 8/2009 | Kiiskinen |
| 2009/0203352 A1 | 8/2009 | Fordon et al. |
| 2009/0217364 A1 | 8/2009 | Salmela et al. |
| 2009/0254857 A1 | 10/2009 | Romine et al. |
| 2009/0282127 A1 | 11/2009 | LeBlanc et al. |
| 2009/0307696 A1 | 12/2009 | Vals et al. |
| 2009/0320110 A1 | 12/2009 | Nicolson et al. |
| 2010/0030890 A1 | 2/2010 | Dutta et al. |
| 2010/0041365 A1 | 2/2010 | Lott et al. |
| 2010/0075666 A1 | 3/2010 | Garner |
| 2010/0121744 A1 | 5/2010 | Belz et al. |
| 2010/0151866 A1 | 6/2010 | Karpov et al. |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188991 A1 | 7/2010 | Raleigh |
| 2010/0188992 A1 | 7/2010 | Raleigh |
| 2010/0188993 A1 | 7/2010 | Raleigh |
| 2010/0188994 A1 | 7/2010 | Raleigh |
| 2010/0188995 A1 | 7/2010 | Raleigh |
| 2010/0190469 A1 | 7/2010 | Vanderveen et al. |
| 2010/0190470 A1 | 7/2010 | Raleigh |
| 2010/0191575 A1 | 7/2010 | Raleigh |
| 2010/0191576 A1 | 7/2010 | Raleigh |
| 2010/0191604 A1 | 7/2010 | Raleigh |
| 2010/0191612 A1 | 7/2010 | Raleigh |
| 2010/0191613 A1 | 7/2010 | Raleigh |
| 2010/0191846 A1 | 7/2010 | Raleigh |
| 2010/0191847 A1 | 7/2010 | Raleigh |
| 2010/0192120 A1 | 7/2010 | Raleigh |
| 2010/0192170 A1 | 7/2010 | Raleigh |
| 2010/0192207 A1 | 7/2010 | Raleigh |
| 2010/0192212 A1 | 7/2010 | Raleigh |
| 2010/0195503 A1 | 8/2010 | Raleigh |
| 2010/0197266 A1 | 8/2010 | Raleigh |
| 2010/0197267 A1 | 8/2010 | Raleigh |
| 2010/0197268 A1 | 8/2010 | Raleigh |
| 2010/0198698 A1 | 8/2010 | Raleigh |
| 2010/0198939 A1 | 8/2010 | Raleigh |
| 2010/0199325 A1 | 8/2010 | Raleigh |
| 2010/0235329 A1 | 9/2010 | Koren et al. |

(56) References Cited

U.S. PATENT DOCUMENTS

| | | |
|---|---|---|
| 2010/0248719 A1 | 9/2010 | Scholaert |
| 2010/0287599 A1 | 11/2010 | He et al. |
| 2010/0311402 A1 | 12/2010 | Srinivasan et al. |
| 2010/0318652 A1 | 12/2010 | Samba |
| 2011/0110309 A1 | 5/2011 | Bennett |
| 2011/0145920 A1 | 6/2011 | Mahaffey et al. |
| 2011/0238545 A1 | 9/2011 | Fanaian et al. |
| 2011/0277019 A1 | 11/2011 | Pritchard, Jr. |
| 2011/0314145 A1 | 12/2011 | Raleigh |
| 2011/0320588 A1 | 12/2011 | Raleigh |
| 2012/0084184 A1 | 4/2012 | Raleigh |
| 2012/0084438 A1 | 4/2012 | Raleigh |
| 2012/0087319 A1 | 4/2012 | Raleigh |
| 2012/0089727 A1 | 4/2012 | Raleigh |
| 2012/0101952 A1 | 4/2012 | Raleigh |
| 2012/0108225 A1 | 5/2012 | Luna et al. |
| 2012/0144025 A1 | 6/2012 | Melander et al. |
| 2012/0166364 A1 | 6/2012 | Ahmad et al. |
| 2012/0166604 A1 | 6/2012 | Fortier et al. |
| 2012/0167162 A1 | 6/2012 | Raleigh |
| 2012/0215911 A1 | 8/2012 | Raleigh |
| 2012/0221955 A1 | 8/2012 | Raleigh |
| 2012/0278722 A1 | 11/2012 | Raleigh |
| 2013/0065551 A1 | 3/2013 | Raleigh |
| 2013/0072177 A1 | 3/2013 | Ross et al. |
| 2013/0132854 A1 | 5/2013 | Raleigh |
| 2013/0196647 A1 | 8/2013 | Raleigh |
| 2013/0275583 A1 | 10/2013 | Roach et al. |
| 2013/0304616 A1 | 11/2013 | Raleigh |
| 2013/0326356 A9 | 12/2013 | Zheng et al. |
| 2014/0040975 A1 | 2/2014 | Raleigh |
| 2014/0059640 A9 | 2/2014 | Raleigh |
| 2014/0066101 A1 | 3/2014 | Lyman et al. |
| 2014/0073291 A1 | 3/2014 | Hildner et al. |
| 2014/0075567 A1 | 3/2014 | Raleigh |
| 2014/0080458 A1 | 3/2014 | Bonner et al. |
| 2014/0098671 A1 | 4/2014 | Raleigh |
| 2014/0241342 A1 | 8/2014 | Constantinof |
| 2015/0149358 A1 | 5/2015 | Robbin et al. |

FOREIGN PATENT DOCUMENTS

| | | | |
|---|---|---|---|
| CN | 1345154 A | | 4/2002 |
| CN | 1508734 A | | 6/2004 |
| CN | 1538730 A | | 10/2004 |
| CN | 1567818 A | | 1/2005 |
| CN | 101035308 A | | 3/2006 |
| CN | 1801829 A | | 7/2006 |
| CN | 1802839 A | | 7/2006 |
| CN | 1889777 A | | 7/2006 |
| CN | 101155343 | | 9/2006 |
| CN | 1867024 A | | 11/2006 |
| CN | 1878160 A | | 12/2006 |
| CN | 1937511 A | | 3/2007 |
| CN | 101123553 A | | 9/2007 |
| CN | 101080055 A | | 11/2007 |
| CN | 101115248 A | | 1/2008 |
| CN | 101127988 A | | 2/2008 |
| CN | 101183958 A | | 5/2008 |
| CN | 101335666 A | | 12/2008 |
| CN | 101341764 A | | 1/2009 |
| CN | 101815275 A | | 8/2010 |
| EP | 1289326 A1 | | 3/2003 |
| EP | 1463238 | | 9/2004 |
| EP | 1503548 A1 | | 2/2005 |
| EP | 1545114 A1 | | 6/2005 |
| EP | 1739518 | | 1/2007 |
| EP | 1772988 | | 4/2007 |
| EP | 1850575 A1 | | 10/2007 |
| EP | 1887732 A1 | | 2/2008 |
| EP | 1978772 | | 10/2008 |
| EP | 2007065 A1 | | 12/2008 |
| EP | 2466831 A1 | | 6/2012 |
| JP | 3148713 B2 | | 3/2001 |
| JP | 2005339247 A | | 12/2005 |
| JP | 2006041989 | | 2/2006 |
| JP | 2006155263 A | | 6/2006 |
| JP | 2006197137 | | 7/2006 |
| JP | 2006344007 A | | 12/2006 |
| JP | 2007318354 A | | 12/2007 |
| JP | 2008301121 A | | 12/2008 |
| JP | 2009111919 | | 5/2009 |
| JP | 2009212707 A | | 9/2009 |
| JP | 2009218773 | | 9/2009 |
| JP | 2009232107 A | | 10/2009 |
| WO | 9858505 | | 12/1998 |
| WO | 9927723 A1 | | 6/1999 |
| WO | 9965185 | | 12/1999 |
| WO | 0245315 A2 | | 6/2002 |
| WO | 02067616 A1 | | 8/2002 |
| WO | 02093877 A1 | | 11/2002 |
| WO | 03014891 | | 2/2003 |
| WO | 03017063 A2 | | 2/2003 |
| WO | 03017065 A2 | | 2/2003 |
| WO | 03058880 | | 7/2003 |
| WO | 2004028070 | | 4/2004 |
| WO | 2004064306 A2 | | 7/2004 |
| WO | 2004077797 | | 9/2004 |
| WO | 2004095753 | | 11/2004 |
| WO | 2005008995 | | 1/2005 |
| WO | 2005083934 A1 | | 9/2005 |
| WO | 2006004467 | | 1/2006 |
| WO | 2006004784 A1 | | 1/2006 |
| WO | 2006012610 A2 | | 2/2006 |
| WO | 2006050758 | | 5/2006 |
| WO | 2006073837 | | 7/2006 |
| WO | 2006077481 | | 7/2006 |
| WO | 2006093961 A1 | | 9/2006 |
| WO | 2006120558 | | 11/2006 |
| WO | 2006130960 | | 12/2006 |
| WO | 2007001833 | | 1/2007 |
| WO | 2007014630 | | 2/2007 |
| WO | 2007018363 | | 2/2007 |
| WO | 2007053848 | | 5/2007 |
| WO | 2007068288 A1 | | 6/2007 |
| WO | 2007069245 | | 6/2007 |
| WO | 2007097786 | | 8/2007 |
| WO | 2007107701 | | 9/2007 |
| WO | 2007120310 | | 10/2007 |
| WO | 2007124279 | | 11/2007 |
| WO | 2007126352 | | 11/2007 |
| WO | 2007133844 A | | 11/2007 |
| WO | 2008017837 | | 2/2008 |
| WO | 2008051379 | | 5/2008 |
| WO | 2008066419 | | 6/2008 |
| WO | 2008080139 | | 7/2008 |
| WO | 2008080430 | | 7/2008 |
| WO | 2008099802 | | 8/2008 |
| WO | 2009008817 A1 | | 1/2009 |
| WO | 2009091295 A1 | | 7/2009 |
| WO | 2010088413 | | 8/2010 |
| WO | 2011002450 A1 | | 1/2011 |
| WO | 2011149532 A1 | | 12/2011 |
| WO | 2012047275 A | | 4/2012 |

OTHER PUBLICATIONS

"The Construction of Intelligent Residential District in Use of Cable Television Network," Shandong Science, vol. 13, No. 2, Jun. 2000.
"Communication Concepts for Mobile Agent Systems," by Joachim Baumann et al.; Inst. of Parallel and Distributed High-Performance Systems, Univ. of Stuttgart, Germany, pp. 123-135, 1997.
"Prevent iCloud Documents & Data from using your data plan," Oct. 26, 2011; CNET webarchive, by Jason Cipriani.
"3rd Generation Partnership Project; Technical Specification Group Services and System Aspects; Policy and charging control architecture (Release 11)," 3GPP Standard; 3GPP TS 23.203 v11.6.0; Sophia Antipolis, France; pp. 1-177; Jun. 2012.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.

(56) References Cited

OTHER PUBLICATIONS

"ASA/PIX: Allow Split Tunneling for VPN Clients on the ASA Configuration Example," Document ID 70917, Jan. 10, 2008.
U.S. Appl. No. 61/206,354, filed Jan. 28, 2009, Raleigh.
U.S. Appl. No. 61/206,944, filed Feb. 4, 2009, Raleigh.
U.S. Appl. No. 61/207,393, filed Feb. 10, 2009, Raleigh.
U.S. Appl. No. 61/207,739, filed Feb. 13, 2009, Raleigh.
U.S. Appl. No. 61/270,353, filed Jul. 6, 2009, Raleigh.
U.S. Appl. No. 61/275,208, filed Aug. 25, 2009, Raleigh.
U.S. Appl. No. 61/237,753, filed Aug. 28, 2009, Raleigh.
U.S. Appl. No. 61/252,151, filed Oct. 15, 2009, Raleigh.
U.S. Appl. No. 61/252,153, filed Oct. 15, 2009, Raleigh.
U.S. Appl. No. 61/264,120, filed Nov. 24, 2009, Raleigh.
U.S. Appl. No. 61/264,126, filed Nov. 24, 2009, Raleigh.
U.S. Appl. No. 61/348,022, filed May 25, 2010, Raleigh.
U.S. Appl. No. 61/381,159, filed Sep. 9, 2010, Raleigh.
U.S. Appl. No. 61/381,162, filed Sep. 9, 2010, Raleigh.
U.S. Appl. No. 61/384,456, filed Sep. 20, 2010, Raleigh.
U.S. Appl. No. 61/389,547, filed Oct. 4, 2010, Raleigh.
U.S. Appl. No. 61/385,020, filed Sep. 21, 2010, Raleigh.
U.S. Appl. No. 61/387,243, filed Sep. 28, 2010, Raleigh.
U.S. Appl. No. 61/387,247, filed Sep. 28, 2010, Raleigh.
U.S. Appl. No. 61/407,358, filed Oct. 27, 2010, Raleigh.
U.S. Appl. No. 61/418,507, filed Dec. 1, 2010, Raleigh.
U.S. Appl. No. 61/418,509, filed Dec. 1, 2010, Raleigh.
U.S. Appl. No. 61/420,727, filed Dec. 7, 2010, Raleigh.
U.S. Appl. No. 61/422,565, filed Dec. 13, 2010, Raleigh.
U.S. Appl. No. 61/422,572, filed Dec. 13, 2010, Raleigh.
U.S. Appl. No. 61/422,574, filed Dec. 13, 2010, Raleigh.
U.S. Appl. No. 61/435,564, filed Jan. 24, 2011, Raleigh.
U.S. Appl. No. 61/472,606, filed Apr. 6, 2011, Raleigh.
U.S. Appl. No. 61/550,906, filed Oct. 24, 2011, Raleigh.
U.S. Appl. No. 61/589,830, filed Jan. 23, 2012, Raleigh.
U.S. Appl. No. 61/610,876, filed Mar. 14, 2012, Raleigh.
U.S. Appl. No. 61/610,910, filed Mar. 14, 2012, Raleigh.
U.S. Appl. No. 61/658,339, filed Jun. 11, 2012, Raleigh.
U.S. Appl. No. 61/667,927, filed Jul. 3, 2012, Raleigh.
U.S. Appl. No. 61/674,331, filed Jul. 21, 2012, Raleigh.
U.S. Appl. No. 61/724,267, filed Nov. 8, 2012, Raleigh.
U.S. Appl. No. 61/724,837, filed Nov. 9, 2012, Raleigh.
U.S. Appl. No. 61/724,974, filed Nov. 10, 2012, Raleigh.
U.S. Appl. No. 61/732,249, filed Nov. 30, 2012, Raleigh.
U.S. Appl. No. 61/734,288, filed Dec. 6, 2012, Raleigh.
U.S. Appl. No. 61/745,548, filed Dec. 22, 2012, Raleigh.
U.S. Appl. No. 61/756,332, filed Jan. 24, 2013, Raleigh.
U.S. Appl. No. 61/758,694, filed Jan. 30, 2013, Raleigh.
U.S. Appl. No. 61/765,978, filed Feb. 18, 2013, Raleigh.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project; "Technical Specification Group Services and System Aspects; IP Flow Mobility and seamless WLAN offload; Stage 2," Release 10, Document No. 3GPP TS 23.261, V1.0.0, Mar. 2010.
Ahmed et al., "Multi Access Data Network Connectivity and IP Flow Mobility in Evolved Packet System (EPS)," 2010 IEEE.
Blackberry Mobile Data System, version 4.1, Technical Overview, 2006.
Client Guide for Symantec Endpoint Protection and Symantec Network Access Control, 2007.
Ehnert, "Small application to monitor IP trafic on a Blackberry—1.01.03", Mar. 27, 2008; http://www.ehnert.net/MiniMoni/.
Fujitsu, "Server Push Technology Survey and Bidirectional Communication in HTTP Browser," Jan. 9, 2008 (JP).
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.

Kuntze et al., "Trustworthy content push," Fraunhofer-Institute for Secure Information Technology SIT; Germany; WCNC 2007 proceedings, IEEE.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Open Mobile Alliance (OMA), Push Architecture, Candidate Version 2.2; Oct. 2, 2007; OMA-AD-Push-V2_2-20071002-C.
Quintana, David, "Mobile Multitasking," Apr. 14, 2010.
Roy et al., "Energy Management in Mobile Devices with the Cinder Operating System", Stanford University, MIT CSAIL, Jun. 3, 2010.
Windows7 Power Management, published Apr. 2009.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Dixon et al., Triple Play Digital Services: Comcast and Verizon (Digital Phone, Television, and Internet), Aug. 2007.
Kassar et al., "An overview of vertical handover decision strategies in heterogeneous wireless networks," ScienceDirect, University Pierre & Marie Curie, Paris, France, Jun. 5, 2007.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
"Ads and movies on the run," the Gold Coast Bulletin, Southport, Qld. Jan. 29, 2008.
"Jentro Technologies launches Zenlet platform to accelerate location-based content delivery to mobile devices," The Mobile Internet, Boston, MA, Feb. 2008.
Jing et al., "Client-Server Computing in Mobile Environments," GTE Labs. Inc., Purdue University, ACM Computing Surveys, vol. 31, No. 2, Jun. 1999.
Kim, "Free wireless a high-wire act; MetroFi needs to draw enough ads to make service add profits," San Francisco Chronicle, Aug. 21, 2006.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Loopt User Guide, metroPCS, Jul. 17, 2008.
Nuzman et al., "A compund model for TCP connection arrivals for LAN and WAN applications," Oct. 22, 2002.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Sabat, "The evolving mobile wireless value chain and market structure," Nov. 2002.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Chandrasekhar et al., "Femtocell Networks: A Survey," Jun. 28, 2008.

(56) References Cited

OTHER PUBLICATIONS

Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Dikaiakos et al., "A Distributed Middleware Infrastructure for Personalized Services," Nov. 24, 2003.
European Commission, "Data Roaming Tariffs—Transparency Measures," [online] retrieved from http://web.archive.org/web/20081220232754/http://ec.europa.eu/information_society/activities/roaming/data/measures/index_en.htm, Dec. 20, 2008 [retrieved May 16, 2012].
Farooq et al., "An IEEE 802.16 WiMax Module for the NS-3 Simulator," Mar. 2-6, 2009.
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Knight et al., "Layer 2 and 3 Virtual Private Networks: Taxonomy, Technology, and Standarization Efforts," IEEE Communications Magazine, Jun. 2004.
Koutsopoulou et al., "Middleware Platform for the Support of Charging Reconfiguration Actions," 2005.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and the Challenges," Scroll, vol. 1, No. 1, 2008.
Nilsson et al., "A Novel MAC Scheme for Solving the QoS Parameter Adjustment Problem in IEEE802.11e EDCA," Feb. 2006.
Oppliger, Rolf, "Internet Security: Firewalls and Bey," Communications of the ACM, May 1997, vol. 40. No. 5.
Rao et al., "Evolution of Mobile Location-Based Services," Communication of the ACM, Dec. 2003.
Steglich, Stephan, "I-Centric User Interaction," Nov. 21, 2003.
Van Eijk, et al., "GigaMobile, Agent Technology for Designing Personalized Mobile Service Brokerage," Jul. 1, 2002.
Zhu et al., "A Survey of Quality of Service in IEEE 802.11 Networks," IEEE Wireless Communications, Aug. 2004.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Ruckus Wireless—White Paper; "Smarter Wi-Fi for Mobile Operator Infrastructures" 2010.
Accuris Networks, "The Business Value of Mobile Data Offload—a White Paper", 2010.
Wireless Broadband Alliance, "WISPr 2.0, Apr. 8, 2010"; Doc. Ref. No. WBA/RM/WISPr, Version 01.00.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Wi-Fi Alliance Technical Committee Hotspot 2.0 Technical Task Group, "Hotspot 2.0 (Release 1) Technical Specification—Version 1.0.0"; 2012.
Wi-Fi Alliance Hotspot 2.0 Technical Task Group, "Wi-Fi Certified Passpoint™ (Release 1) Deployment Guidelines—Version 1.0—Oct. 2012".
Search Report and Written Opinion mailed Jan. 6, 2015 from International Serial No. PCT/US2014/025353 filed Mar. 13, 2014.

\* cited by examiner

Transfer your number

The information below is required by your old carrier to transfer number to ItsOn Mobile.

First Name (required)

| First Name |

Last Name (required)

| Last Name | or

Business Name

| Business Name |

The mobile number you want to transfer (required)

| Phone Number (contact) |

Last 4 digits of Social Security Number or Tax ID (required if account number/name unavailable)

| Cancel |

AUTOMATED CREDENTIAL PORTING FOR MOBILE DEVICES

CROSS REFERENCE TO OTHER APPLICATIONS

This application claims the benefit of U.S. Provisional Application No. 61/785,988, filed Mar. 14, 2013, entitled AUTOMATED CREDENTIAL PORTING FOR MOBILE DEVICES, which is hereby incorporated by reference for all purposes.

This document incorporates by reference for all purposes the following non-provisional U.S. patent applications: U.S. application Ser. No. 12/380,780, filed Mar. 2, 2009, entitled AUTOMATED DEVICE PROVISIONING AND ACTIVATION; U.S. application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); U.S. application Ser. No. 12/695,020, filed Jan. 27, 2010, entitled ADAPTIVE AMBIENT SERVICES; U.S. application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); U.S. application Ser. No. 12/694,451, filed Jan. 27, 2010, entitled DEVICE GROUP PARTITIONS AND SETTLEMENT PLATFORM; U.S. application Ser. No. 12/694,455, filed Jan. 27, 2010, entitled DEVICE ASSISTED SERVICES INSTALL; U.S. application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); U.S. application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); U.S. application Ser. No. 13/134,028, filed May 25, 2011, entitled DEVICE-ASSISTED SERVICES FOR PROTECTING NETWORK CAPACITY; U.S. application Ser. No. 13/229,580, filed Sep. 9, 2011, entitled WIRELESS NETWORK SERVICE INTERFACES; U.S. application Ser. No. 13/237,827, filed Sep. 20, 2011, entitled ADAPTING NETWORK POLICIES BASED ON DEVICE SERVICE PROCESSOR CONFIGURATION; U.S. application Ser. No. 13/253,013, filed Oct. 4, 2011, entitled SYSTEM AND METHOD FOR PROVIDING USER NOTIFICATIONS; U.S. application Ser. No. 13/239,321, filed Sep. 21, 2011, entitled SERVICE OFFER SET PUBLISHING TO DEVICE AGENT WITH ON-DEVICE SERVICE SELECTION; U.S. application Ser. No. 13/248,028, filed Sep. 28, 2011, entitled ENTERPRISE ACCESS CONTROL AND ACCOUNTING ALLOCATION FOR ACCESS NETWORKS; U.S. application Ser. No. 13/247,998, filed Sep. 28, 2011, entitled SECURE DEVICE DATA RECORDS; U.S. application Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK; U.S. application Ser. No. 13/309,463, filed Dec. 1, 2011, entitled SECURITY, FRAUD DETECTION, AND FRAUD MITIGATION IN DEVICE-ASSISTED SERVICES SYSTEMS; U.S. application Ser. No. 13/248,025, filed Sep. 28, 2011, entitled SERVICE DESIGN CENTER FOR DEVICE ASSISTED SERVICES; and U.S. application Ser. No. 13/374,959, filed Jan. 24, 2012, entitled FLOW TAGGING FOR SERVICE POLICY IMPLEMENTATION; U.S. application Ser. No. 13/441,821, filed Apr. 6, 2012, entitled MANAGING SERVICE USER DISCOVERY AND SERVICE LAUNCH OBJECT PLACEMENT ON A DEVICE; U.S. application Ser. No. 13/134,005, filed May 25, 2011, entitled SYSTEM AND METHOD FOR WIRELESS NETWORK OFFLOADING; U.S. application Ser. No. 13/802,483, filed Mar. 13, 2013, entitled MOBILE DEVICE ACTIVATION VIA DYNAMICALLY SELECTED ACCESS NETWORK; U.S. application Ser. No. 13/842,172, filed Mar. 15, 2013, entitled NETWORK SERVICE PLAN DESIGN; and U.S. application Ser. No. 13/748,152, filed Jan. 23, 2013, entitled SERVICE PLAN DESIGN, USER INTERFACES, APPLICATION PROGRAMMING INTERFACES, AND DEVICE MANAGEMENT.

This document incorporates by reference for all purposes the following provisional patent applications: U.S. Provisional Application No. 61/206,354, filed Jan. 28, 2009, entitled SERVICES POLICY COMMUNICATION SYSTEM AND METHOD; U.S. Provisional Application No. 61/206,944, filed Feb. 4, 2009, entitled SERVICES POLICY COMMUNICATION SYSTEM AND METHOD; U.S. Provisional Application No. 61/207,393, filed Feb. 10, 2009, entitled SERVICES POLICY COMMUNICATION SYSTEM AND METHOD; and U.S. Provisional Application No. 61/207,739, entitled SERVICES POLICY COMMUNICATION SYSTEM AND METHOD, filed Feb. 13, 2009; U.S. Provisional Application No. 61/270,353, filed on Jul. 6, 2009, entitled DEVICE ASSISTED CDR CREATION, AGGREGATION, MEDIATION AND BILLING; U.S. Provisional Application No. 61/275,208, filed Aug. 25, 2009, entitled ADAPTIVE AMBIENT SERVICES; and U.S. Provisional Application No. 61/237,753, filed Aug. 28, 2009, entitled ADAPTIVE AMBIENT SERVICES; U.S. Provisional Application No. 61/252,151, filed Oct. 15, 2009, entitled SECURITY TECHNIQUES FOR DEVICE ASSISTED SERVICES; U.S. Provisional Application No. 61/252,153, filed Oct. 15, 2009, entitled DEVICE GROUP PARTITIONS AND SETTLEMENT PLATFORM; U.S. Provisional Application No. 61/264,120, filed Nov. 24, 2009, entitled DEVICE ASSISTED SERVICES INSTALL; U.S. Provisional Application No. 61/264,126, filed Nov. 24, 2009, entitled DEVICE ASSISTED SERVICES ACTIVITY MAP; U.S. Provisional Application No. 61/348,022, filed May 25, 2010, entitled DEVICE ASSISTED SERVICES FOR PROTECTING NETWORK CAPACITY; U.S. Provisional Application No. 61/381,159, filed Sep. 9, 2010, entitled DEVICE ASSISTED SERVICES FOR PROTECTING NETWORK CAPACITY; U.S. Provisional Application No. 61/381,162, filed Sep. 9, 2010, entitled SERVICE CONTROLLER INTERFACES AND WORKFLOWS; U.S. Provisional Application No. 61/384,456, filed Sep. 20, 2010, entitled SECURING SERVICE PROCESSOR WITH SPONSORED SIMS; U.S. Provisional Application No. 61/389,547, filed Oct. 4, 2010, entitled USER NOTIFICATIONS FOR DEVICE ASSISTED SERVICES; U.S. Provisional Application No. 61/385,020, filed Sep. 21, 2010, entitled SERVICE USAGE RECONCILIATION SYSTEM OVERVIEW; U.S. Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; U.S. Provisional Application No. 61/387,247, filed September 28, entitled SECURED DEVICE DATA RECORDS, 2010; U.S. Provisional Application No. 61/407,358, filed Oct. 27, 2010, entitled SERVICE CONTROLLER AND SERVICE PROCESSOR ARCHITECTURE; U.S. Provisional Application No. 61/418,507, filed Dec. 1, 2010, entitled APPLICATION SERVICE PRO- VIDER INTERFACE SYSTEM; U.S. Provisional Application No. 61/418,509, filed Dec. 1, 2010, entitled SERVICE USAGE REPORTING RECONCILIATION AND FRAUD DETECTION FOR DEVICE ASSISTED SERVICES; U.S. Provisional Application No. 61/420,727, filed Dec. 7, 2010, entitled SECURE DEVICE DATA RECORDS; U.S. Provisional Application No. 61/422,565, filed Dec. 13, 2010, entitled SERVICE DESIGN CENTER FOR DEVICE ASSISTED SERVICES; U.S. Provisional Application No. 61/422,572, filed Dec. 13, 2010, entitled SYSTEM INTERFACES AND WORKFLOWS FOR DEVICE ASSISTED SERVICES; U.S. Provisional Application No. 61/422,574, filed Dec. 13, 2010, entitled SECURITY AND FRAUD DETECTION FOR DEVICE ASSISTED SERVICES; U.S. Provisional Application No. 61/435,564, filed Jan. 24, 2011, entitled FRAMEWORK FOR DEVICE ASSISTED SERVICES; U.S. Provisional Application No. 61/472,606, filed Apr. 6, 2011, entitled MANAGING SERVICE USER DISCOVERY AND SERVICE LAUNCH OBJECT PLACEMENT ON A DEVICE; U.S. Provisional Application No. 61/550,906, filed Oct. 24, 2011, entitled SECURITY FOR DEVICE-ASSISTED SERVICES; U.S. Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; U.S. Provisional Application No. 61/610,876, filed Mar. 14, 2012, entitled METHODS AND APPARATUS FOR APPLICATION PROMOTION AND SPONSORSHIP; U.S. Provisional Application No. 61/610,910, filed Mar. 14, 2012, entitled WIFI ACTIVATION BACKUP PROCESS; U.S. Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE; U.S. Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT; U.S. Provisional Application No. 61/674,331, filed Jul. 21, 2012, entitled SERVICE CONTROLLER FOR MANAGING CLOUD-BASED POLICY; U.S. Provisional Application No. 61/724,267, filed Nov. 8, 2012, entitled FLEXIBLE SERVICE PLAN DESIGN, USER INTERFACE AND DEVICE MANAGEMENT; U.S. Provisional Application No. 61/724,837, filed Nov. 9, 2012, entitled SERVICE PLAN DISCOVERY, CUSTOMIZATION, AND MANAGEMENT; U.S. Provisional Application No. 61/724,974, filed Nov. 10, 2012, entitled SERVICE PLAN DISCOVERY, CUSTOMIZATION, AND MANAGEMENT; U.S. Provisional Application No. 61/732,249, filed Nov. 30, 2012, entitled APPLICATION PROGRAMMING INTERFACES FOR SMART SERVICES; U.S. Provisional Application No. 61/734,288, filed Dec. 6, 2012, entitled INTERMEDIATE NETWORKING DEVICE SERVICES; and U.S. Provisional Application No. 61/745,548, filed Dec. 22, 2012, entitled SERVICE PLAN DESIGN, USER INTERFACES, APPLICATION PROGRAMMING INTERFACES, AND DEVICE MANAGEMENT; U.S. Provisional Application No. 61/756,332, filed Jan. 24, 2013, entitled MOBILE HOTSPOT; U.S. Provisional Application No. 61/758,964, filed Jan. 30, 2013, entitled MOBILE HOTSPOT; U.S. Provisional Application No. 61/765,978, filed Feb. 18, 2013, entitled ENHANCED CURFEW AND PROTECTION ASSOCIATED WITH A DEVICE GROUP; U.S. Provisional Application No. 61/794,116, filed Mar. 15, 2013, entitled ENHANCED INTERMEDIATE NETWORKING DEVICE; U.S. Provisional Application No. 61/792,765, filed Mar. 15, 2013, entitled DEVICE GROUP AND SERVICE PLAN MANAGEMENT; U.S. Provisional Application No. 61/793,894, filed Mar. 15, 2013, entitled SIMPLIFIED POLICY DESIGN, MANAGEMENT, AND IMPLEMENTATION; U.S. Provisional Application No. 61/799,710, filed Mar. 15, 2013, entitled AMBIENT OR SPONSORED SERVICES; and U.S. Provisional Application No. 61/801,074, filed Mar. 15, 2013, entitled DEVICE GROUP AND SERVICE PLAN MANAGEMENT.

BACKGROUND

With the advent of mass-market wireless mobile devices and subscription wireless services, there are an increasing number of instances in which a mobile device user who has subscribed to a service provided by a service provider will stop using one device in favor of a new or otherwise different device, or stop his or her subscription with one service provider in favor of subscribing with another service provider. It is often the case that when a subscriber obtains a new device or moves from one service provider to another, the subscriber wishes to remain associated with the same phone number he or she has been using.

BRIEF DESCRIPTION OF THE DRAWINGS

Objects, features, and advantages of the present disclosure will be more clearly understood from the following detailed description taken in conjunction with the accompanying drawings, in which:

FIGS. 7A and 7B illustrate an exemplary screens for entering account information to complete a phone number transfer.

DETAILED DESCRIPTION

Figure 1:
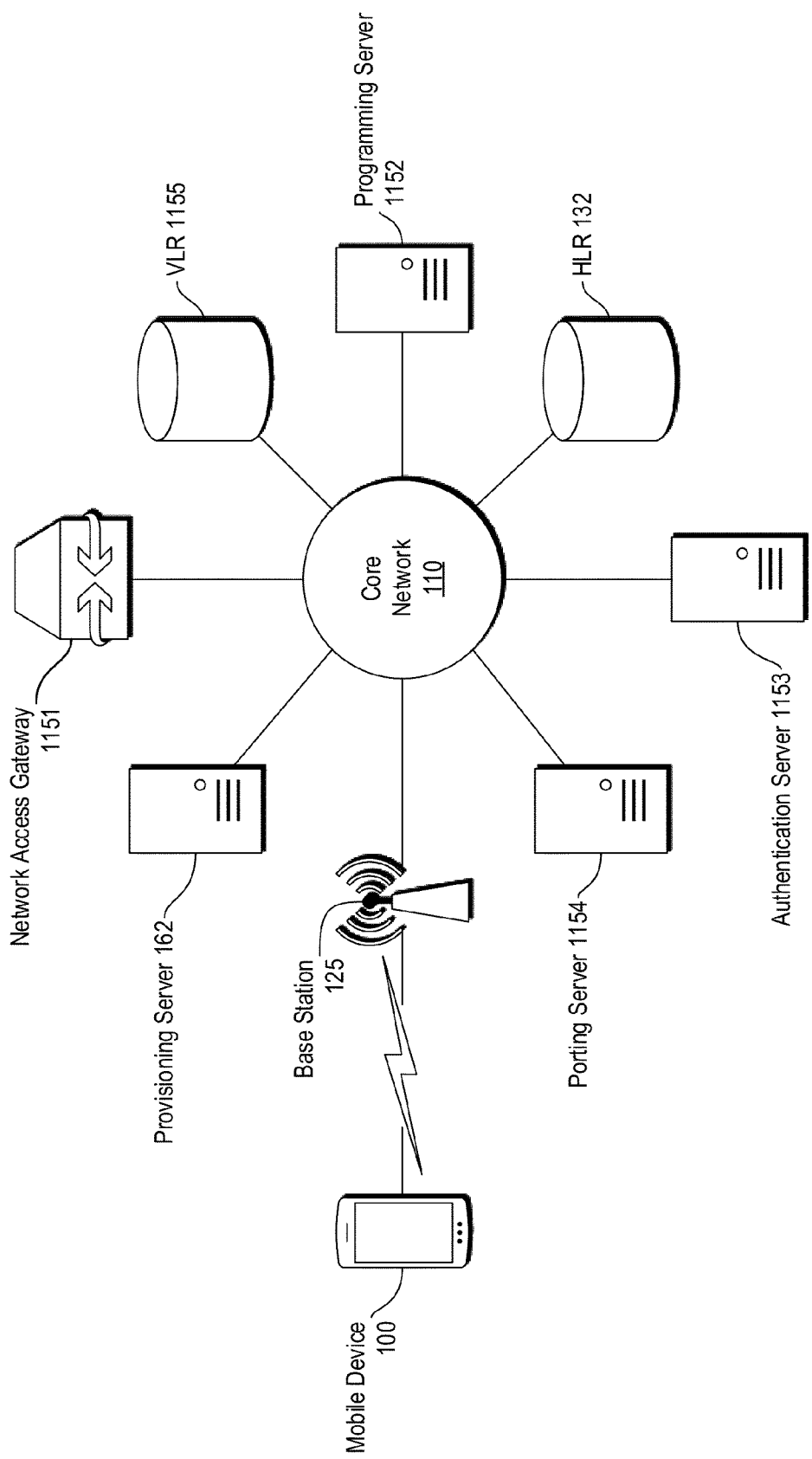
FIG. 1 illustrates components of a wireless network architecture in accordance with some embodiments.

This document discloses a mobile device wireless service management system to provide automated phone number porting (also referred to herein as "phone number transferring" or "number transfer").

A wireless device (also referred to herein as a "mobile device" or simply as a "device") communicates over a wireless access network (also referred to as the "network") with a network system comprising one or more network elements to access resources, such as data services, voice services, messaging services, transactional services, etc.

In a wireless network system, mobile devices authenticate with the network system based on credentials that are stored on the device and verified by the network system. Examples of credentials include, but are not limited to, a phone number, an international mobile subscriber identifier (IMSI), a mobile station identifier (MSID), a mobile station international ISDN number (MSISDN), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a mobile directory number (MDN), a network access identifier (NAI), a user name, a password, access point name (APN) configuration information (e.g., APN name, APN username, APN password, APN gateway, APN SMSC/MMSC, APN type, etc.), an encryption key (Ki), a Wi-Fi service set identifier (SSID), a Wi-Fi network configuration (e.g., access point (AP) name, AP IP address, AP username, AP password, AP encryption type, AP security key, etc.), an IP address, any other identifying information that uniquely identifies a wireless device, and combinations of these. Some credentials (e.g., an ESN, a device identifier, etc.) are permanently associated with a device. But other credentials (e.g., a SIM, a phone number, etc.) may be moved from one device to another device. These movable credentials are referred to herein as "portable credentials."

To gain access to a wireless access network, a subscriber needs some sort of account with the service provider (also referred to as an "operator," "network operator," "wireless operator," or similar term). Although some consumers choose pre-loaded, pre-paid, "disposable" devices, many consumers have ongoing accounts (either pre-pay or post-pay) with service providers. A subscriber's account with a service provider is typically associated with a portable credential. For example, a subscriber account may be associated with a SIM card that stores information needed for a device containing the SIM to access a particular service provider's network.

When a device is capable of making phone calls, the device and the subscriber's account are associated with a telephone number (or "phone number"), which can be ported from one device to another or from one service provider to another. It is often the case that when a subscriber obtains a new device or moves his or her service subscription from one service provider to another, the subscriber wishes to remain associated with the same phone number he or she has been using.

There are several circumstances in which a phone number that is currently associated with a particular device and a current service provider needs to be ported. First, a subscriber could decide to upgrade or change the particular device to a new device, but stay with the current service provider and keep the current phone number. Second, a subscriber could decide to change from the current service provider to a new service provider, but keep the particular device and the current phone number. Third, a subscriber could decide to change from the current service provider to the new service provider, and also upgrade or change the particular device to the new device, but keep the current phone number. Fourth, a subscriber could have a first device associated with a first phone number and a first service provider, and a second device associated with a second phone number and a second service provider, and the subscriber wishes to port the first phone number to the second device.

When the subscriber decides to upgrade or change the particular device to a new device, but chooses to stay with the current service provider and keep the current phone number, the porting of the phone number is typically simple because the subscriber already has an account with the current service provider, and the subscriber's phone number is already recognized by the current service provider. For GSM devices, porting the subscriber's phone number from the current device to the new device is accomplished by moving the SIM from the current device to the new device, which can often be done by the subscriber without support from or, in some cases, knowledge of the current service provider.

When the subscriber changes from the current service provider to a new service provider, however (e.g., the second, third, and fourth cases described above), the process of porting a number from one service provider to another takes some amount of time and can, in extreme cases, take days. At some point during the number porting process, the device and the network system of the current service provider can no longer communicate, and the device and the network system of the new service provider cannot communicate until the credentials stored on the device are updated to match the credentials stored in the new service provider's network system. Sometimes the new service provider sets up the subscriber's mobile device with temporary credentials so the mobile device can operate on the new wireless provider's network while the number porting process is ongoing. The temporary credentials allow the subscriber to begin using service with the new service provider immediately, even though the number porting is not complete. But because the credentials that allow the subscriber to use service with the new service provider while the number porting process is ongoing are temporary credentials, when the porting process is complete, the subscriber's mobile device needs to be updated with the desired credentials, including the subscriber's phone number.

Today, when it is necessary to update a wireless device using temporary credentials so that the device thereafter uses the intended credentials, the user of the wireless device may need to intervene to update the credentials so the device can communicate with the new service provider's network system with its desired credentials. This intervention is sometimes a sequence of steps that forces the device into a state where it can contact a programming server to get its credentials updated. Other times, the sequence entails the user manually programming the credentials into the device.

Disclosed herein are systems, devices, and methods that provide for the updating of device credentials after a phone number port without user intervention. In some embodiments, the mobile device detects a network provisioning state change (e.g., detects that the device credentials are to be updated) and automatically initiates a programming session with a programming server to enable the device to obtain the desired credentials without the intervention of the user. Automation of this process ensures that the updating of credentials occurs when necessary and without user intervention. One of the benefits of this process is that it can reduce calls to a customer care center because this process helps to ensure that the device does not enter into a state in which it cannot interact with the network system and, as a result, appear to be unusable to the end user.

In some embodiments, the device comprises one or more device agents that determine when the desired phone number, previously associated with a different service provider, is available for porting onto the device so that a user of the device does not need to take any action to determine when the number is available for porting or to begin the porting process. In these and other embodiments, the one or more device agents may be configured to automatically determine that the desired phone number is available for porting and initiate the device side of the number porting process. In some embodiments, the one or more device agents are embodied in a service processor on the device.

In some embodiments, the device user can initiate number porting during initial account set up or creation, or during initial device setup, directly on the device. In some embodiments, the user can enter, through a user interface of the device, a request to cause a different device's phone number to be ported onto the device.

FIG. 1 illustrates components of a typical wireless network system. Mobile device 100 communicates with core network 110 through base station 125. To gain access to voice, messaging, and data services, mobile device 100 authenticates with various network elements, including home location register (HLR) 132, authentication server 1153, and network access gateway 1151. Failure to authenticate with these elements normally results in denied service access via the wireless network.

In some embodiments, a subscriber is able to initiate a number port (or "number transfer") directly from mobile device 100. In some embodiments, the subscriber accesses a device application and enters, into a device application user interface (UI), the information needed to initiate the port. In some embodiments, the number porting is assisted by one or more device agents that run on the mobile device that the phone number is desired to be ported to. The one or more device agents can comprise an application program, an operating system (OS) component, an OS function, an OS service, a modem programming agent, a modem software or firmware agent, an over-the-air (OTA) mobile device parameter programing agent, an Open Mobile Alliance (OMA) agent, a secure communication agent configured to communicate number porting and number provisioning information, another software or firmware agent, or a combination of these.

In some embodiments, the one or more device agents communicate with one or more network elements (e.g., porting server 1154) that are configured to exchange number porting information and number provisioning information with the one or more device agents. In some embodiments, the one or more device agents establish a secure communication link with the one or more network elements to allow the secure exchange of number porting information and number provisioning information. In some embodiments, the formatting and/or protocols for the communications between the one or more device agents and the one or more network elements are established according to an application programming interface (API) between the one or more device agents responsible for (e.g., initiating) number porting and the one or more network elements that assist in the porting.

In some embodiments, after the one or more device agents collect the information from the subscriber, the one or more device agents communicate the information to porting server 1154. In some embodiments, the communication is over a cellular network. In some embodiments, the communication is over the short messaging service (SMS) channel. In some embodiments, the communication is over a Wi-Fi network. Porting server 1154 is responsible for initiating and managing the porting process between the wireless operator and the porting agency (or the subscriber's previous service provider, or an intermediary brokering system). In some embodiments, mobile device 100 stores a local copy of the subscriber's phone number that was entered on the device application when the port was initiated.

In some embodiments, a subscriber wishes to port a phone number associated with a second device or a second service account (the "second phone number") to a first device. In some such embodiments, the number porting is assisted by one or more network elements (e.g., porting server 1154) that are configured to communicate with the one or more device agents on the first device to exchange account information. The one or more network elements then submit the request or instruction to port the second phone number to the first device to a subscriber management system responsible for managing the association of the second phone number with the second device or the second service account. The one or more network elements then obtain an indication that the second phone number has been released, and the one or more network elements communicate with the one or more device agents to cause the second phone number to be ported to the first device. In some embodiments, a subscriber management system responsible for managing the association of the second phone number with the first device participates in the number porting process by provisioning an aspect of the network policy associated with the first device to recognize or authenticate the second phone number for the first device.

In some embodiments, a first subscriber management system that manages a first device communicates with a second subscriber management system that manages a second device to request the phone number port and provides user information to authenticate the port of a phone number from either the first device to the second device or vice versa. In some embodiments the first device and/or number and second device and/or number are both managed by the same subscriber management system; in this case, the subscriber management system goes to itself to request the number port and provides user information to authenticate the port.

Once the porting process is complete, porting server 1154 updates wireless operator provisioning server 162, which then provisions certain network elements, including programming server 1152, with the new credentials (e.g., telephone number, network access identifier (NAI), user name, password, IP address, etc.), including the telephone number. In some embodiments, the updating of the provisioning information to the network elements will cause mobile device 100 to stop functioning on the network because its credentials are no longer associated with an active subscriber account.

In some embodiments, when the provisioning of the network system with the new device credentials is complete, mobile device 100 detects that it can no longer access the network. Detection of denied access to the network can include failed registration attempts, failed authentication attempts (e.g., invalid user name, invalid password, invalid telephone number, invalid device identifier, etc.), or failed authorization for services. When mobile device 100 detects that it can no longer access the network, it checks its internal state. In some embodiments, detecting the internal state comprises comparing one or more current device credentials with an expected credential (e.g., comparing a current phone number with an expected new phone number). When mobile device 100 detects that a current device credential does not match the expected credential, and mobile device 100 expects the credential to change, mobile device 100 enters into a programming session with programming server 1152. In some embodiments, putting mobile device 100 into a programming session entails providing a set of bootstrap credentials to mobile device 100, where the bootstrap credentials provide the mobile device with limited access to the network (e.g., mobile device 100 can only access the programming server 1152 either directly or indirectly via network access gateway 1151). In some embodiments, mobile device 100 is configured to communicate with programming server 1152 via a Wi-Fi or another type of alternative network. In some embodiments, the subscriber associated with mobile device 100 is not charged for usage of the wireless access network or alternative network associated with the device's communications with programming server 1152 (i.e., usage is not accounted to a user account, or usage is zero-rated by the service provider or another party).

Once mobile device 100 has access to programming server 1152, mobile device 100 initiates a programming communication session with programming server 1152. In some embodiments, device interaction with programming server 1152 is over the data channel, the SMS channel, the voice channel, the unstructured supplementary service data (USSD) channel, or over Wi-Fi or another network that provides mobile device 100 with access to programming server 1152. In some embodiments, when mobile device 100 is accessing programming server 1152, access to other network elements or network end-points is restricted or prohibited. Programming server 1152 delivers the new device credentials to the mobile device 100. Mobile device 100 receives the updated credentials and stores the new credentials locally on the device. Upon completion of the programming session, mobile device 100 begins to use the new credentials to access the wireless network. In some embodiments, mobile device 100 compares the new credentials to the expected credentials to determine if the current credentials are, in fact, the expected credentials or additional interim credentials. In some embodiments, if the current credentials match the expected credentials, the update process is determined to be complete.

In some embodiments, an over the air device provisioning network element (e.g., programming server 1152) participates in the number porting process by causing an aspect of a first device's credentials to be re-programmed to provision a new phone number onto the first device. In some embodiments, the aspect of the first device's credentials that is re-programmed to provision the new phone number onto the first device comprises the phone number or mobile directory number (MDN), NAI, password, access point name (APN) configuration information (e.g., APN name, APN username, APN password, APN gateway, APN SMSC/MMSC, APN type, etc.), username, IP address, MAC address, international mobile subscriber identity (IMSI), encryption key (Ki), Wi-Fi service set identifier (SSID), Wi-Fi network configuration (e.g., access point (AP) name, AP IP address, AP username, AP password, AP encryption type, AP security key, etc.), or a combination of these.

It is to be appreciated that the functions described above are illustrated in FIG. 1 in a particular way, but that the functions may be disposed differently than shown in FIG. 1. In particular, the functions may be performed by more or fewer network elements than shown in FIG. 1.

Figure 2:
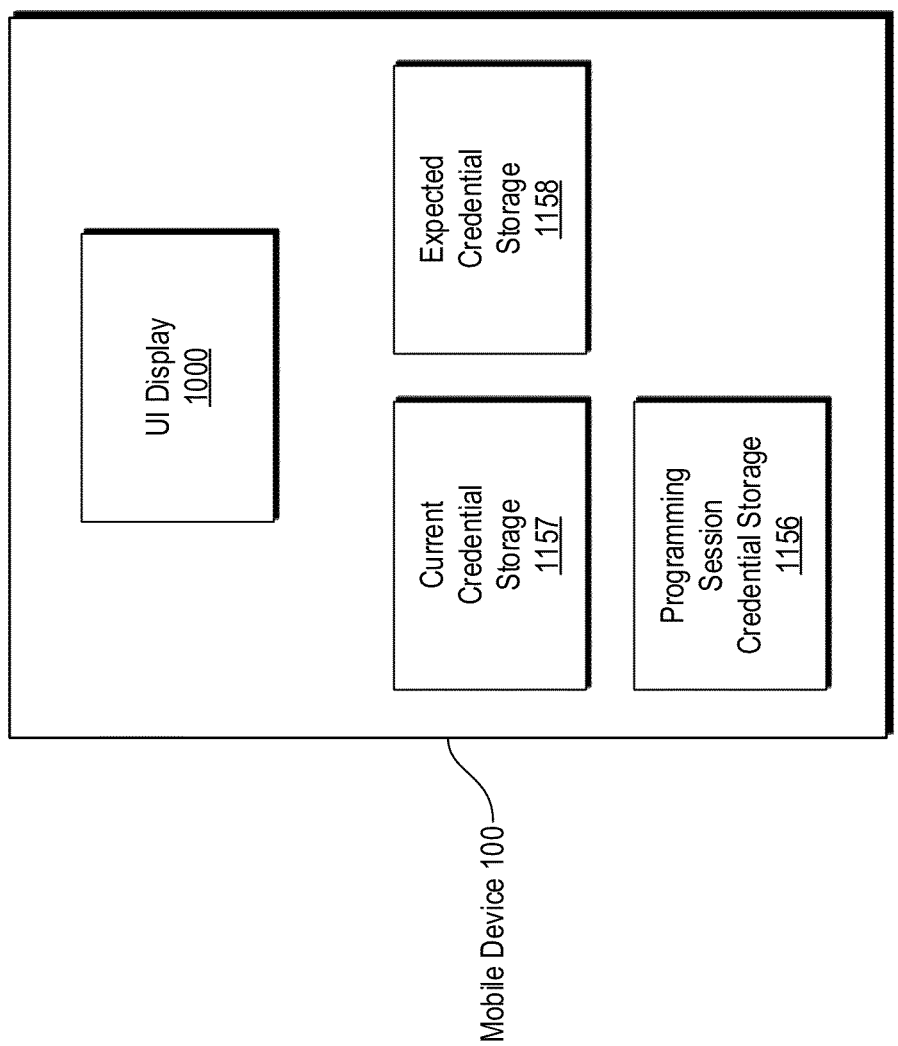
FIG. 2 illustrates components of a mobile device in accordance with some embodiments.

FIG. 2 illustrates various components of mobile device 100, including UI display 1000, through which the subscriber can interact with the device application via the display and UI element (e.g., on-screen keyboard, speech recognition processor, physical keyboard, etc.). Current credential storage 1157 is device memory where mobile device 100 stores its current credentials to access the wireless network. In some embodiments, current credential storage 1157 is protected or encrypted to prohibit the user from directly (or indirectly) modifying the information stored in current credential storage 1157. In some embodiments, current credential storage 1157 is accessible only to the wireless modem that allows the device to access the wireless access network.

Programming session credential storage 1156 is device memory where mobile device 100 stores the credentials and configuration to access programming server 1152. In some embodiments, the programming session credentials include network type (e.g., cellular, Wi-Fi, Bluetooth, etc.), network name (e.g., APN name, Wi-Fi SSID, etc.) or other information that enables mobile device 100 to access programming server 1152. In some embodiments, programming session credential storage 1156 is protected or encrypted to prohibit the user from directly (or indirectly) modifying the information stored in programming session credential storage 1156. In some embodiments, programming session credential storage 1156 is accessible only to the wireless modem that allows the device to access the wireless access network.

Expected credential storage 1158 is device memory where mobile device 100 stores the expected credentials to be programmed to mobile device 100. In some embodiments, mobile device 100 uses the expected credentials to detect when mobile device 100 has received its final set of credentials related to the transaction that caused the credentials to change (e.g., a request to port a new phone number to mobile device 100). For example, the expected credentials could be the porting phone number, a new network access identifier, a new IP address, etc.

It is to be appreciated that although FIG. 2 illustrates current credential storage 1157, expected credential storage 1158, and programming session credential storage 1156 separately, they may all be located in the same memory (which may be secure memory).

Figure 3:
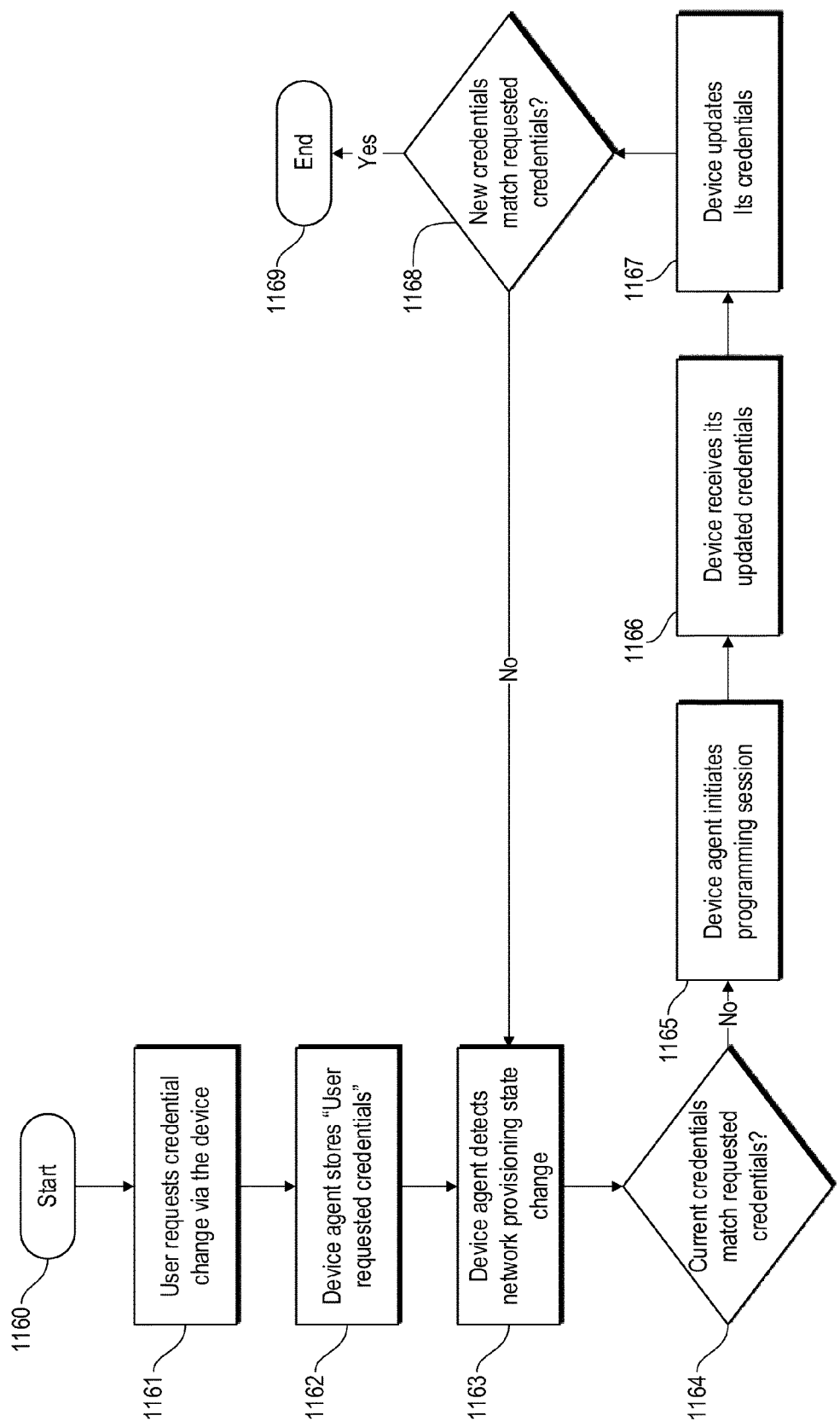
FIG. 3 illustrates a flow diagram for updating one or more credentials of a mobile device in accordance with some embodiments.

FIG. 3 is a flowchart showing a procedure to update one or more credentials of a mobile device in accordance with some embodiments. At 1160, the procedure starts. At 1161, the device user requests to have at least some aspect of the one or more device credentials changed via a UI interaction on the device. Examples of UI interaction include interaction with a browser application, an OS application, an OS settings application, a native application, etc. The UI interaction causes the device to communicate with an application server (e.g., porting server 1154, programming server 1152) to facilitate and complete the credential change request.

At 1162, the device stores (e.g., using one or more device agents) the requested credential information locally on the device. In some embodiments, the device receives this information from the application server or other network element. In some embodiments, the device receives this information from the UI interaction application on the device or from the one or more device agents. In some embodiments, the requested credential information includes information about all of the one or more credentials that were requested to be changed. In some embodiments, the requested credential information contains a subset of information about all of the one or more credentials that were requested to be changed. In some embodiments in which, at the time the number port is requested, the device is associated with a first phone number and/or other first credential(s), the number being ported and/or other re-provisioning information is not fully programmed onto the device before the first number and/or other first credential(s) become partially invalid or invalid.

At 1163, the device detects the network provisioning state change. There are a number of ways in which the device can detect the network provisioning state change, including denied registration attempts, denied voice call attempts, denied text message transmission attempts, failed authentication with a network element, failed authorization for services, or any other mechanism that signals the device that network provisioning has changed.

At 1164, the device determines whether a current credential matches the requested credential to determine if there is a mismatch between the credential that is currently programmed on the device and the credential that the device is expecting to be programmed on the device. In some embodiments, the requested credential may be a configuration state indicator, and the device inspects the configuration state indicator to determine if the device expected additional credential updates associated with the credential change request.

At 1165, the device has determined that it is expecting a credential update, and as a result the device initiates a programming session (e.g., the one or more device agents initiate a programming session). In some embodiments, initiating a programming session entails setting the device to a well-known configuration state (e.g., a bootstrap state, etc.) to enable the device to contact a network element (e.g., programming server 1152). In some embodiments, initiating a programming session entails switching the device to an alternative network (e.g., Wi-Fi, etc.) or communication channel (e.g., SMS, etc.) prior to initiating communications with the network element (e.g., programming server 1152). In some embodiments, the communication with the network element (e.g., programming server 1152) utilizes an ambient service so that usage of the wireless access network associated with the device's communication with the network element is subsidized or paid-for by an entity other than the party responsible for paying for access to the wireless access network by the device (e.g., the party responsible for paying for access to the wireless access network by the device is the user, subscriber, account-holder, enterprise, parent, etc.). In some embodiments, when the communication with the network element (e.g., programming server 1152) occurs using an ambient service, the party responsible for paying for access to the wireless access network by the device (e.g., the user, subscriber, account-holder, enterprise, parent, etc.) is not charged for the network communications associated with the device programming.

At 1166, the device communicates with the network element (e.g., programming server 1152) to obtain its updated credential(s). In some embodiments, the device performs an authentication process with the network element (e.g., programming server 1152). In some embodiments, the configuration data is encrypted or delivered over an encrypted and secure channel. In some embodiments, the configuration data is encrypted using device-specific information (e.g., an IMSI, Ki, A-key, MAC address, etc.), either directly or indirectly.

At 1167, after the device receives its updated credentials, it updates its local memory with the new credentials. In some embodiments, the updated credentials also include updated device configuration information (e.g., access server information, new data network configuration, device UI configuration, branding information, etc.). For example, the updated device configuration information can include a logo, color scheme, icon, or any other branding information that indicates the device is now associated with a different service provider.

At 1168, the device compares the updated credentials with the expected credentials to determine if the credential update process associated with the initial transaction (at 1161) is complete. In some embodiments, there may be additional interim credentials assigned to the device while the transaction is in progress. In some embodiments, the transaction requires multiple credential updates. In some embodiments, the device checks a credential update state variable to determine if the credential update process is complete. If the credential update process is complete, the process ends at 1169. If the device expects further credential updates associated with the transaction initiated at 1161, the device continues to monitor for network provisioning state change (at 1163) and continues the cycle until the credential update process completes.

In some embodiments, the device performs the updating process automatically without informing the subscriber. In some embodiments, the credential update occurs in the background and is undetected by the user. In some embodiments, the programming process requires the device to be restarted one or more times. In some embodiments, when a reboot is required, it is desirable to present a visual or audible notification to the user to inform the user that the device is updating and/or rebooting. In some embodiments, the notification enables the user to postpone the update and/or device reboot.

Figure 4:
FIG. 4 illustrates an exemplary screen including a mechanism to request a new phone number or initiate a phone number transfer request from the device.

In some embodiments, the one or more device agents present a number porting option through a first device's UI to enable a user to port a phone number that is currently assigned to a second device (the "second phone number") onto the first device. In some embodiments, such as the exemplary embodiment shown in FIG. 4, the one or more device agents present an account UI screen 1170 to the user and provide a mechanism to request a new phone number or initiate a phone number transfer (e.g., port of the second phone number to the first device) request from the device. The UI element could be a menu item, a status bar item, a list item, dialog box, or any other UI construct to enable the user to initiate a phone number transfer request. In the embodiment illustrated by FIG. 4, the UI construct is a touch-sensitive button the user can touch to initiate a number transfer. As illustrated by FIG. 4, the screen 1170 informs the user that the user can press the "Transfer" button either to transfer an existing number to the device, or to request a new number.

Figure 5:
FIG. 5 illustrates an exemplary number management screen displayed when a user selects the "Transfer" region of FIG. 4.

In some embodiments, such as the exemplary embodiment shown in FIG. 5, in response to the user initiating a transfer (e.g., selecting "Transfer" in the embodiment shown in FIG. 4), the one or more device agents present a number management screen 1171 to the user and provide a mechanism to either request a new number or initiate a number transfer (port) request from the device. The UI element could be a menu item, a status bar item, a list item, dialog box, or any other UI construct to enable the user to manage his or her phone number on the device. In some embodiments, the one or more device agents may restrict the parties who are authorized to transfer a number. In the embodiment shown in FIG. 5, for example, a number transfer can be initiated from any device with the "Admin" role, where the "Admin" role is held by a subscriber, a parent, an enterprise, a device group manager, or any other designated party who is authorized to modify the settings or characteristics of the device for which the number transfer is being requested.

Figure 6:
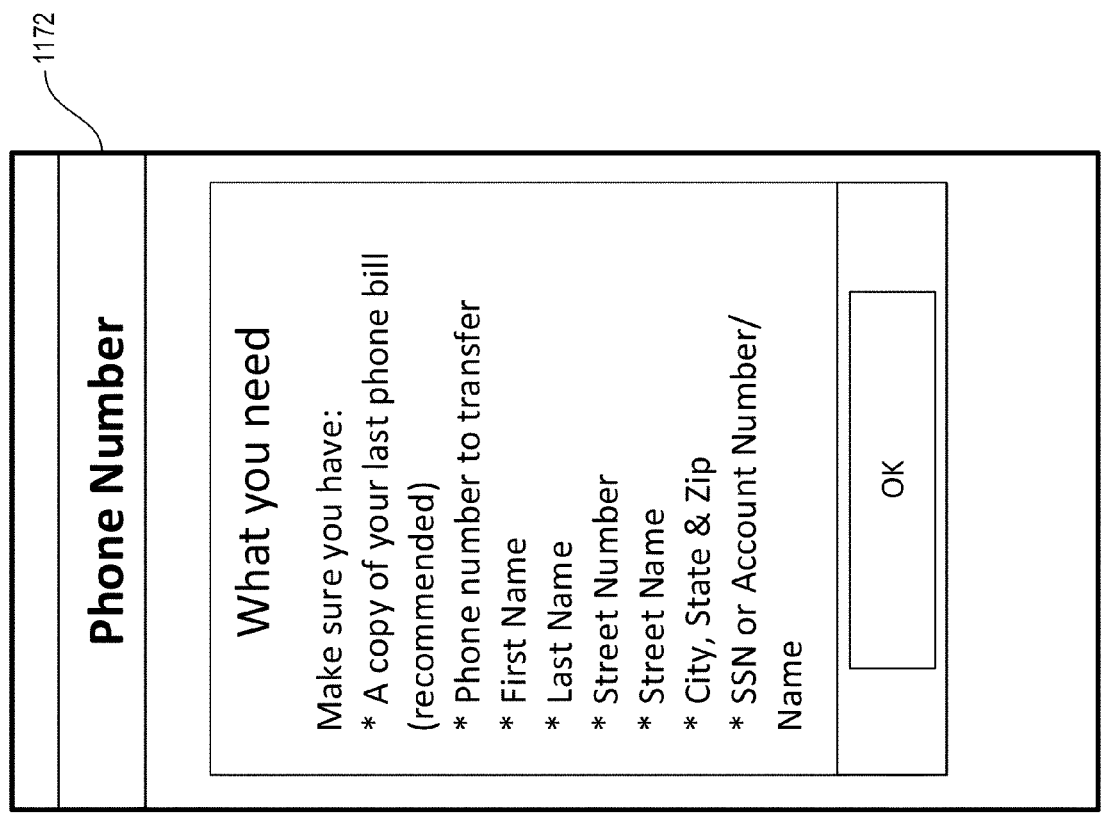
FIG. 6 illustrates an exemplary screen displaying a notification listing the information to complete a phone number transfer.

In some embodiments, when the user initiates the transfer of the second phone number from a first service provider to a second service provider (e.g., the user selects "Transfer my number from another phone" on the screen 1171 shown in FIG. 5), the one or more device agents present a screen to inform the user about information the user will need to provide in order to complete the request. In the embodiment shown in FIG. 6, for example, the one or more agents assist in presenting a notification 1172 through the display to inform the user that he or she should have a copy of the user's last bill from the first service provider (so that the user can enter, for example, an account number or other information commonly found on a service provider bill), the phone number to transfer, the first and last name of the user, the user's address, and the user's social security number or account number (or account name) with the first service provider.

In some embodiments, when the user accepts the number porting option (e.g., the user selects the "Continue" option of FIG. 5 or the "OK" option of FIG. 6), the one or more device agents present a screen to gather the second phone number, user information, and/or account information associated with the service account currently associated with the second phone number. In some embodiments, such as the representative screens 1173 and 1174 illustrated in FIGS. 7A and 7B, once the user decides to initiate a phone number transfer request, the user enters the requested information through the device UI to allow the second phone number to be transferred to the device (e.g., from a first service provider currently providing service to the second phone number to the service provider associated with the device to which the second phone number is requested to be transferred). In some embodiments, the information entered by a user to transfer a phone number includes one or more of the following pieces of information: phone number to transfer, billing first name, billing last name, company name, billing address (e.g., street number, street name, city, state, ZIP code), user's social security number, a portion of the user's social security number (e.g., last 4 digits), current-service-provider account number, current-service-provider account password, current-service-provider account PIN, or any other information to identify the subscriber or the account with the current service provider. In some embodiments, to prevent the inadvertent or malicious transfer of the second phone number to the device, the information entered includes information that is or should only be known by a subscriber associated with the second phone number (e.g., some or all of the subscriber's social security number, account number, password, PIN, etc.)

In some embodiments, all of the information to be collected to initiate the transfer of the second phone number to the device is entered on a single UI screen. In some embodiments, such as the exemplary embodiment of FIGS. 7A and 7B, the information to be collected is entered on multiple UI screens 1173 and 1174. In some embodiments, the user is queried about the current service provider (e.g., identifying information about the service provider currently providing service associated with the second phone number). In some embodiments, a network element assists in determining the current service provider by querying an entity. In some embodiments, the entity is a local database, a porting management entity, a remote database, or another system that contains the information. In some embodiments in which the current service provider is known, the information to be collected by the one or more device agents on the mobile device is tailored to the requirements of the current service provider (e.g., service provider "A" only requires first name, last name, phone number to port, and billing zip code; service provider "B" only requires phone number to port and account password, etc.).

Figure 8:
FIG. 8 illustrates an exemplary screen requesting confirmation from the user to initiate the phone number transfer request.

In some embodiments, after the user enters the information needed for the one or more device agents to initiate the number transfer, the one or more device agents assist in presenting a confirmation screen through the user interface of the device. FIG. 8 illustrates an example of such a confirmation screen 1175. As shown in FIG. 8, the confirmation screen 1175 informs the user that it is important that the information provided by the user to initiate the transfer of the second phone number be correct. The screen of FIG. 8 asks the user to review the information and confirm that the information entered is correct.

Figure 7B:
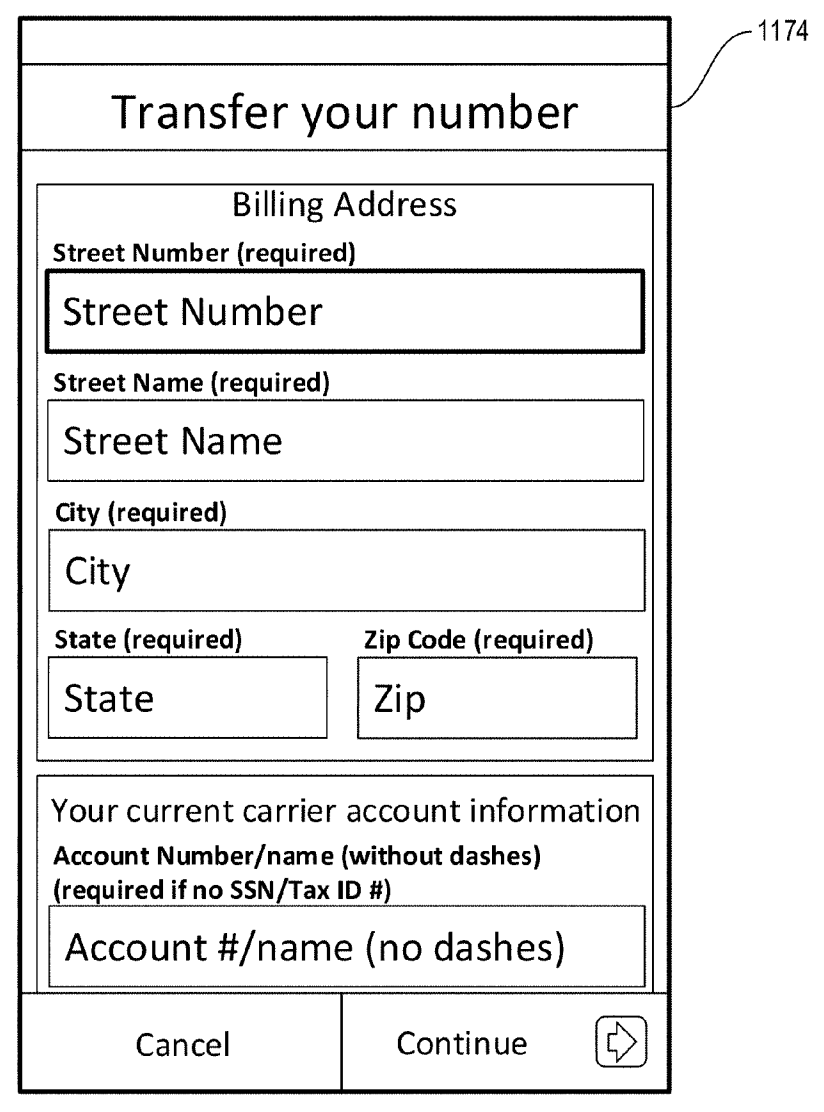
Figure 9:
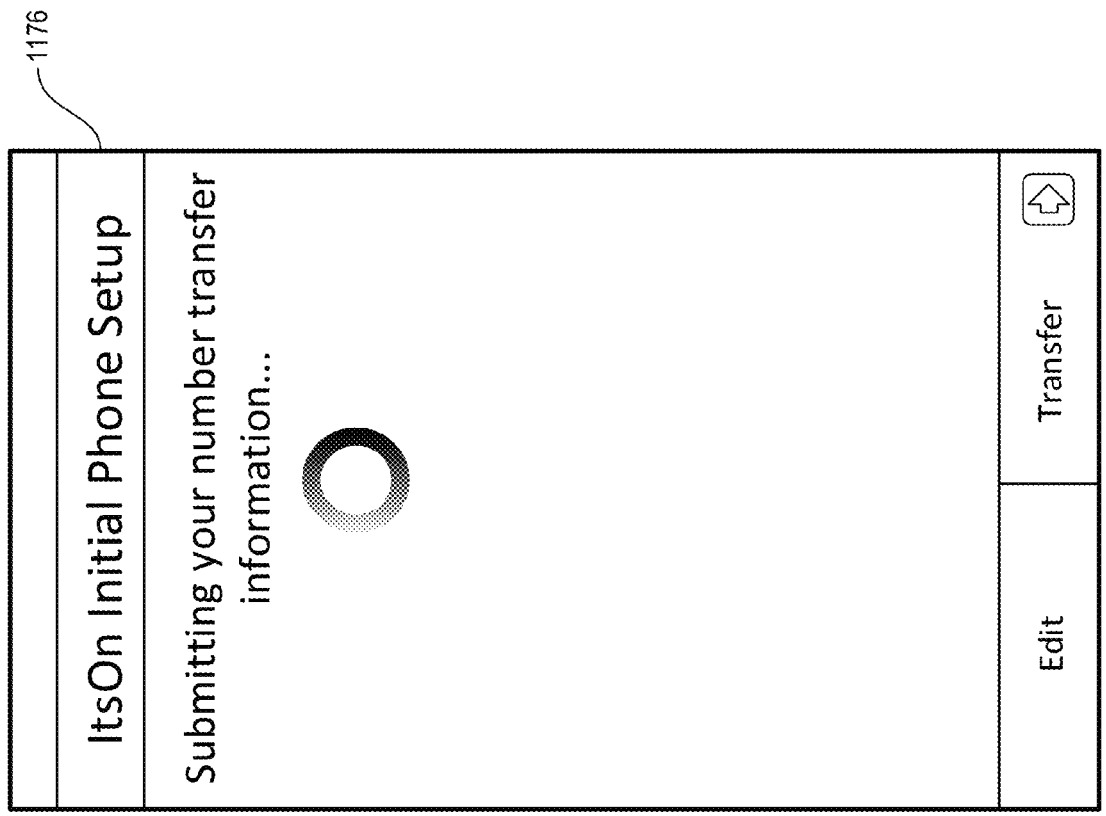
FIG. 9 illustrates an exemplary screen displaying a notification that the number transfer request has been initiated.

In some embodiments, after the user has provided the information needed for the one or more device agents to initiate the number transfer (e.g., the user has provided the information requested by the screens 1173 and 1174 illustrated in FIGS. 7A and 7B, or the user has selected "OK" from the screen 1175 illustrated in FIG. 8), the one or more device agents initiate the number transfer and provide a notification to the user that the number transfer process is beginning FIG. 9 illustrates a specific embodiment of such a notification 1176. As shown in FIG. 9, the notification 1176 may include an icon or other indicia to indicate to the user that the number transfer information is being submitted.

Figure 10:
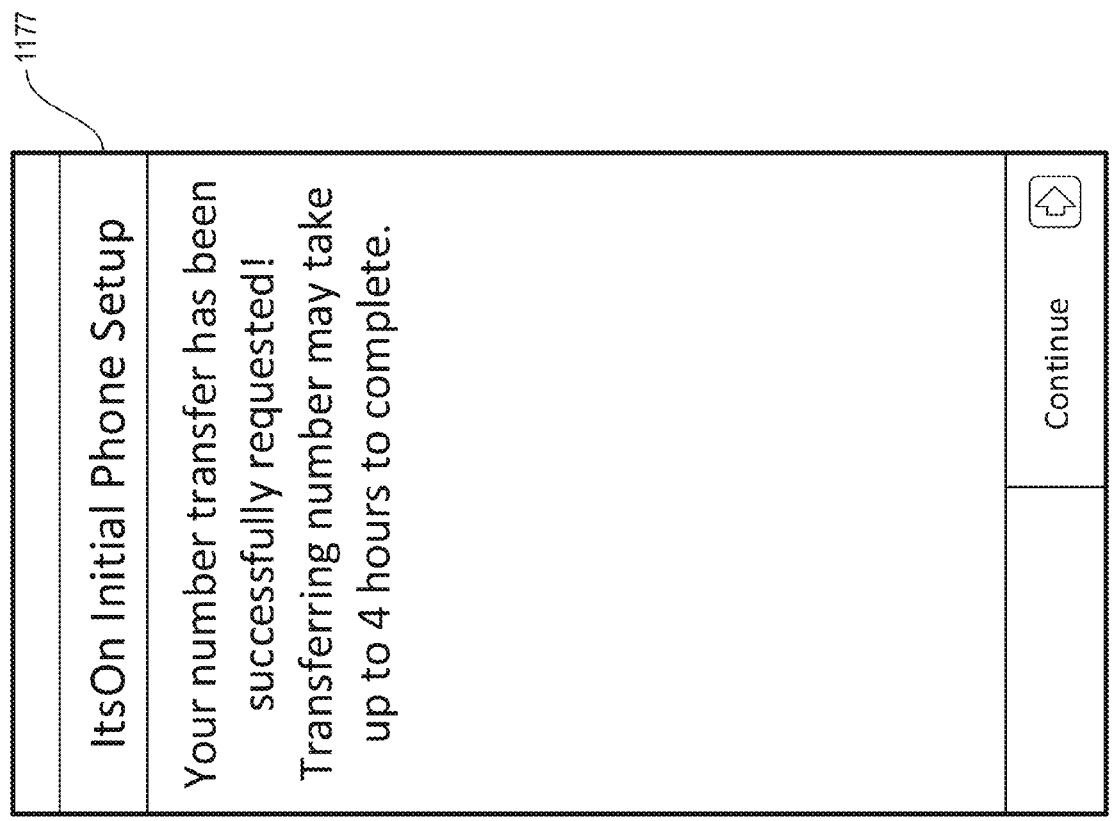
FIG. 10 illustrates an exemplary screen displaying a notification that the number transfer request has been successfully requested.

In some embodiments, after the one or more device agents have successfully initiated the number transfer, the one or more device agents assist in providing a notification to the user to inform the user that the number transfer has been requested. In some embodiments, the notification provides additional information, such as when the number transfer is expected to be completed. FIG. 10 illustrates a particular embodiment of such a notification 1177. The notification 1177 informs the user that the number transfer has been successfully requested, and that transferring the number may take up to four hours to complete.

Figure 11:
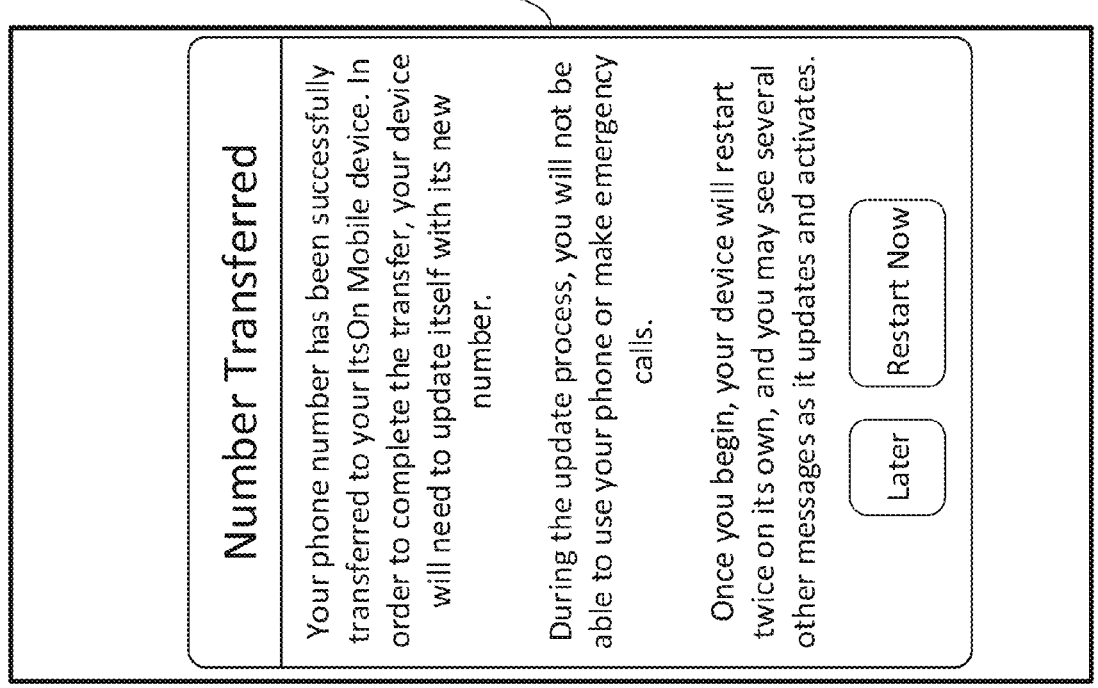
FIG. 11 illustrates an exemplary screen displaying a notification that the phone number has been successfully transferred to the device.

In some embodiments, as the porting process proceeds, the one or more device agents present notification messages (e.g., audible or visible notifications) through a first device UI to inform the user of the progress of the porting process. For example, the one or more device agents can present one or more messages through a display to inform the user that the port is proceeding, that the device has limited or no access to the wireless access network, that settings are being updated, that information is being loaded, that the device needs to be rebooted, etc. For example, the messages may inform the user that the user needs to reboot the device in order for the number port to complete. FIG. 11 illustrates a particular embodiment of such a notification 1178. In the embodiment of FIG. 11, the notification 1178 informs the user that the phone number has been successfully transferred to the device. In the embodiment of FIG. 11, the notification 1178 also informs the user that the device will need to update itself with its new number, and that during the update process, the user will not be able to use the device or make emergency calls. In addition, in the embodiment of FIG. 11, the notification 1178 informs the user that during the update process, the device will restart twice without user intervention, and the user may see additional messages as the device updates and activates. In the embodiment of FIG. 11, the notification 1178 presents the user with an option to defer the updating process until later.

Figure 12:
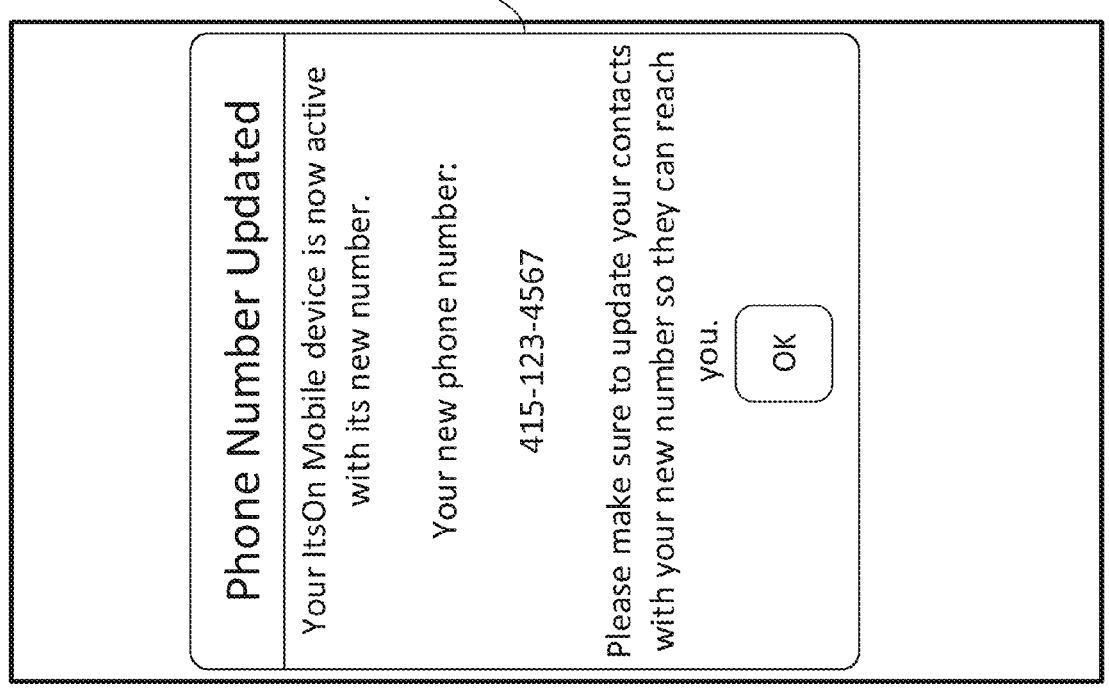
FIG. 12 illustrates an exemplary screen displaying a notification that the number transfer process has been successfully completed.

The one or more device agents can also present a notification upon completion of the number porting process to inform the user that the port was successful and/or that the device is now associated with the second phone number. FIG. 12 illustrates one such embodiment. In the embodiment of FIG. 12, the notification 1179 informs the user that the device is now active with its new number (the second phone number).

The one or more device agents can also present a notification if the number porting process fails, where such notification informs the user of the failure and, in some embodiments, provides additional information about the failure and/or directs the user to customer service for assistance.

Figure 13:
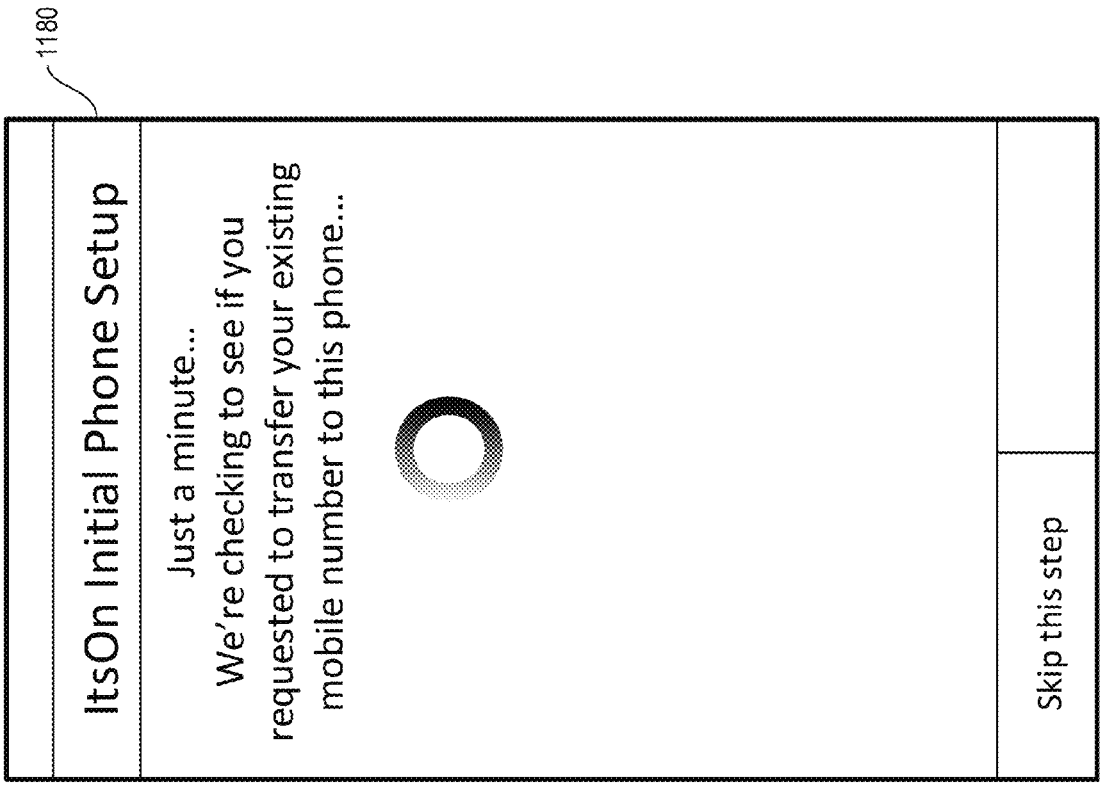
FIG. 13 illustrates an exemplary screen displaying a notification that the device is checking whether the user requested a transfer of the user's existing mobile number to the new device.
Figure 14:
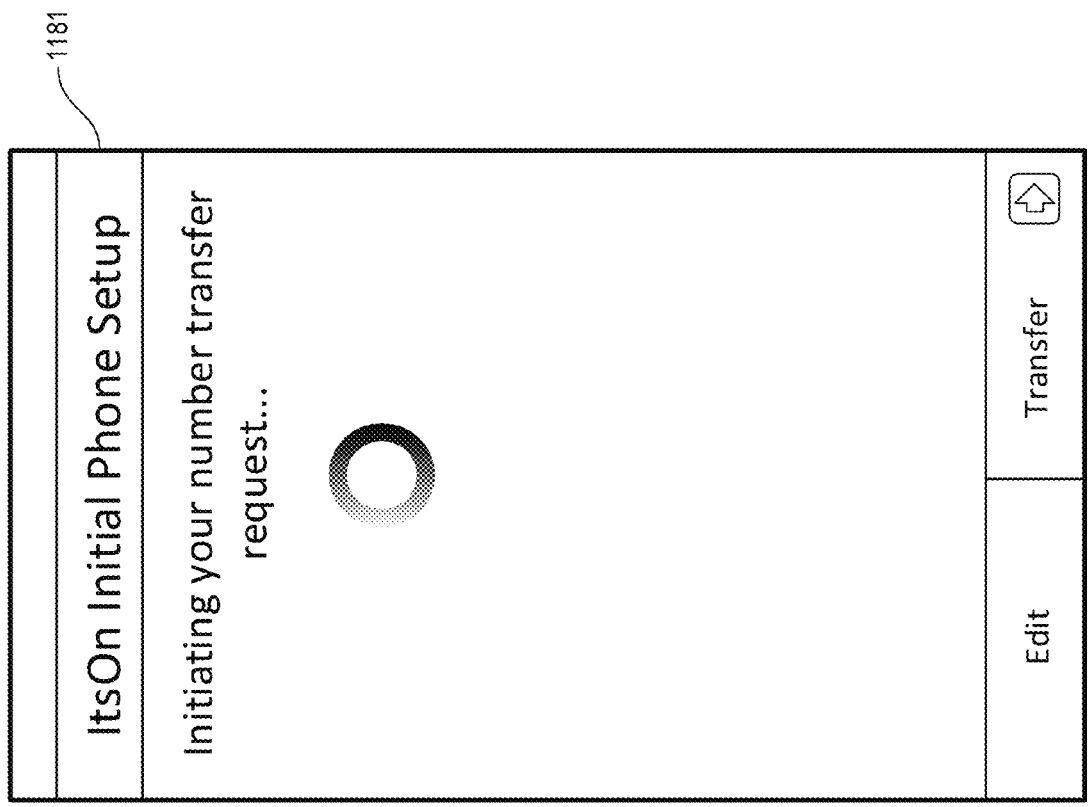
FIG. 14 illustrates an exemplary screen displaying a notification that the phone number transfer request has been initiated.

In some embodiments, a user orders a new device through a website associated with the new service provider. In some such embodiments, the user specifies when ordering the new device that the user wishes to port an existing phone number to the new device. Because the user does not want the number to be ported before the user has received the device, the new service provider pre-configures the new device with information that will allow the transfer of the existing number to the new device after the user receives the new device. When the user receives the new device and powers on the device, the device initiates the number transfer using information pre-configured by the new service provider. FIG. 13 illustrates a notification message 1180 that a user of the new device sees in accordance with a particular embodiment. As shown in FIG. 13, the one or more device agents assist in presenting a notification message 1180 that informs the user that the one or more device agents are checking to see whether the user requested a transfer of the user's existing mobile number to the new device. FIG. 14 illustrates a notification message 1181 that a user of the new device might see if the one or more device agents determine that the user requested a number transfer prior to receiving the new device. In the embodiment illustrated in FIG. 14, the notification message 1181 informs the user that the number transfer request is being initiated. In some embodiments in which the user requests a number transfer at the time of ordering a device, the one or more device agents perform one or more of the tasks described previously in the context of FIGS. 9-12.

Figure 15:
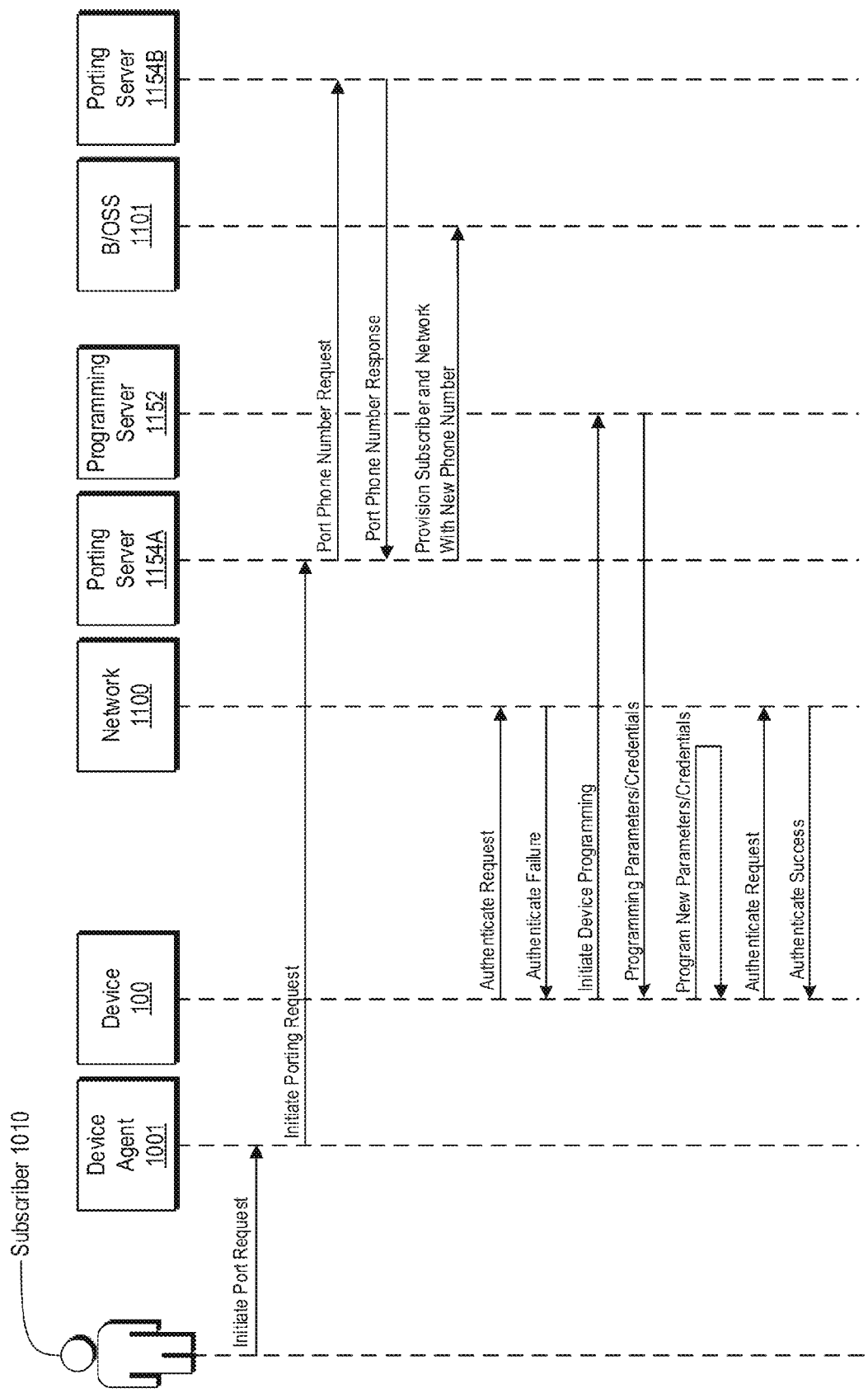
FIG. 15 is a transactional diagram illustrating a device-initiated number porting process with automatic reprogramming in accordance with some embodiments.

FIG. 15 illustrates a device-initiated number porting process with automatic reprogramming according to some embodiments. In FIG. 15, the subscriber 1010 desires to port his number from his or her prior service provider to a new service provider. The subscriber 1010 initiates a port request with assistance from one or more device agents (shown simply as "Device Agent" in FIG. 15). The one or more device agents assist in collecting the number porting information from the subscriber 1010. The one or more agents can comprise one or more of an application program, an operating system (OS) component, an OS function, an OS service, a modem programming agent, a modem software or firmware agent, an over-the-air (OTA) mobile device parameter programming agent, an Open Mobile Alliance (OMA) agent, a secure communication agent configured to communicate number porting and number provisioning information, or another software or firmware agent.

Once the one or more device agents collect the porting information from the subscriber, the one or more agents communicate with porting server 1154A to communicate the porting request. Porting server 1154A is associated with the new service provider. Porting server 1154A can comprise one or more of a subscriber management system, a dedicated element to manage number porting, a clearinghouse porting server, a billing system, a provisioning system, or any other system that manages the number porting process for a service provider. Porting server 1154A communicates with porting server 1154B, which is associated with the subscriber's prior service provider, to request that the subscriber's telephone number be ported from the prior service provider to the new service provider. In some embodiments, porting server 1154A communicates directly with porting server 1154B. In some embodiments, porting server 1154A communicates with porting server 1154B via one or more intermediary servers or systems. In some embodiments, the one or more intermediary servers or systems are associated with a clearinghouse service to broker number porting requests between service providers.

Upon successful validation of the information associated with the subscriber's number porting request, porting server 1154B releases the association of the ported telephone number with the prior service provider and acknowledges the port phone number request to porting server 1154A. Once porting server 1154A receives the acknowledgement from porting server 1154B, porting server 1154A initiates a provisioning request to the current service provider's business/operational support systems (B/OSS) 1101. In some embodiments, provisioning of B/OSS 1101 includes provisioning programming server 1152 with the new device credentials and parameters. The new device credentials and parameters can comprise a phone number or mobile directory number (MDN), NAI, password, access point name (APN) configuration information (e.g., APN name, APN username, APN password, APN gateway, APN SMSC/MMSC, APN type, etc.), username, IP address, MAC address, International Mobile Subscriber Identity (IMSI), Encryption Key (Ki), Wi-Fi SSID, Wi-Fi network configuration (e.g., AP name, AP IP address, AP username, AP password, AP encryption type, AP security key, etc.), or a combination of these. In some embodiments, provisioning of B/OSS 1101 includes provisioning of the network elements (e.g., HLR, HSS, 2A Server, gateway servers, authentication servers and systems, access control systems) to associate the new device credentials with subscriber 1010.

When device 100, using its existing credentials, attempts to authenticate or be authorized by the new service provider's network system 1100 for services, network system 1100 (shown in FIG. 15 as "Network") denies the request. When the one or more device agents receive the authentication or authorization failure, the one or more device agents automatically initiate a programming session with programming server 1152. In some embodiments, the one or more device agents assist in presenting (e.g., displaying a message through a device display or screen, providing an audible message through a speaker, etc.) a notification to subscriber 1010 prior to initiating the device reprogramming process. In some embodiments, the one or more device agents assist in causing device 100 to be rebooted prior to initiating the programming session, or they assist in notifying a user to reboot device 100. In some embodiments, the one or more device agents assist in configuring device 100 with credentials to enable the programming session. During the programming session, the one or more device agents receive the updated device credentials or parameters, and the one or more agents update the device credentials or parameters with the credentials or parameters received from programming server 1152.

Upon completion of the programming session, device 100 can successfully authenticate with the new service provider's network system 1100 and be authorized for services. In some embodiments, upon completion of the programming session, the one or more device agents assist in rebooting device 100 to enable it to use the new credentials. In some embodiments, upon completion of the programming session, the one or more device agents assist in resetting the modem to enable device 100 to use the new credentials. In some embodiments, the one or more device agents assist in presenting (e.g., displaying a message through a device display or screen, providing an audible message through a speaker, etc.) a notification to subscriber 1010 to provide information related to the completion of the phone number port.

Exemplary Use Case 1: Number Porting Information is Pre-Stored on the Device Before the Number Porting Takes Place In some embodiments, a user wishes to port a phone number associated with a second device (the "second phone number") to a first device. In some such embodiments, one or more device agents on the first device accept the second phone number and possibly other associated information about an account associated with the second device. The one or more device agents relay this information to a network element. In some embodiments, the one or more device agents are then prepared for auto-reprogram to the second phone number by pre-storing on the first device at least a portion of the provisioning information needed to port the second phone number before the number port has taken place in the network-based subscriber management systems and/or over-the-air (OTA) programming systems. In some embodiments, the one or more device agents are configured to detect a port initiation condition that indicates the porting process should be initiated, and the one or more device agents utilize the pre-stored information to assist in implementing the number port. In some embodiments, the port initiation condition comprises a condition where a first phone number, assigned to the first device at the time the porting request is initiated, is no longer assigned to the first device. In some embodiments, determining that the first phone number is no longer assigned comprises determining that the device cannot access a mobile network with the credentials associated with the first phone number. In some embodiments, the port initiation condition comprises a signal from the one or more network elements. In some embodiments, the port initiation condition comprises determining that network access over a mobile network has been restricted or prevented.

In some embodiments, the one or more device agents accept the second phone number desired to be ported onto the device, communicate the information to a network element, and prepare for auto-reprogram to the second phone number but do not re-program the device immediately. In some such embodiments, the one or more device agents wait for a condition in which the first phone number is no longer valid and then automatically re-program the device and re-acquire the network.

Exemplary Use Case 2: Device Utilizes a Restricted Link Once the Number Porting has been Initiated In some embodiments, a user wishes to port a phone number associated with a second device (the "second phone number") to a first device. In some such embodiments, one or more device agents on the first device assist in the porting of the second phone number. In some embodiments, when the porting of the second phone number port is approved and the second phone number is released from the second service provider, the one or more device agents have access via a restricted mobile network access policy to a network server associated with the one or more device agents, and this network server assists in porting the second phone number to the first device. In some embodiments, the network server provides OTA programming of the second phone number and possibly other parameters (e.g., other credentials). In some embodiments, after providing OTA programming, the network server causes the device to authenticate or re-authenticate to the network system.

In some embodiments, a limited-access-permission ambient (i.e., non-user-paid) service through the wireless access network is provided to enable devices that do not have a valid phone number or other network access credential to communicate with a programming server. In some such embodiments, some or all devices that are not recognized by the network authentication system have access to a server that can re-provision a device's phone number, other network access credentials, or other network access configuration if a number port has been authorized and/or completed for the device.

In some embodiments, at some point in number porting process a subscriber management system associated with the first device provisions the network elements to reflect the second phone number and/or device access credentials, and at that point a policy allows the first device to have limited network access to communicate with the programming server, even if the first device has a partially invalid credential or set of credentials.

Exemplary Use Case 3: The Mobile Network Recognizes Two Numbers for the First Device, at Least for a Period of Time In some embodiments, a user wishes to port a phone number associated with a second device (the "second phone number") to a first device that, at the time the porting request is initiated, is associated with a first phone number. In some such embodiments, one or more device agents on the first device assist in the porting of the second phone number. In some embodiments, the network system is configured to allow the first device to access the network system with credentials associated with the first phone number and with credentials associated with the second phone number, at least for a period of time. In some such embodiments, when the number port is complete, and the first device accesses the network with credentials associated with the first phone number, the programming server or other network element signals to the first device (e.g., sends an SMS message to the one or more device agents, sends a data transport message to the one or more device agents, etc.) that the device requires reprogramming. In some embodiments, the one or more device agents initiate communications with the programming server to retrieve the new network access credentials (e.g., the credentials associated with the second phone number). In some embodiments, the new credentials are pre-stored on the first device, and the first device automatically reprograms itself without contacting the programming server.

In some embodiments, it is also desirable to update another configuration of the first device, including, for example, an application configuration. In some embodiments, there are certain applications that use device-related credentials to access a service where the service associates a device or user with a set of well-known credentials (e.g., a voice mail application). In some embodiments, when the phone number or other credential associated with the first device changes, the applications that use device credentials must communicate the device or subscriber credential change to the service. In some embodiments, a network element (e.g., provisioning server, programming server, subscriber management server, etc.) assists in updating the service with the new device credential. In some embodiments, the device application is required to log in, authenticate, or associate the user's service with the new credential. In some embodiments, the re-authentication, log in, or service association occurs automatically without user intervention. In some embodiments, prior to the re-authentication, log in, or service association with the new credential, the user is required to enter a valid PIN, password, or other credential to authorize the change to the service credentials. In some embodiments, the service credentials include access credentials. In some embodiments, the service credentials include account credentials or information (e.g., phone number for voice mail account, etc.)

In some embodiments, an already-resident or downloaded application exists on the user's current device. In some embodiments, the application assesses usage and determines if there is a better service offer (i.e., a service offer that would reduce costs to the user or that would otherwise benefit the user). In some embodiments, the better service offer is a service offer with the user's current service provider (i.e., the service provider associated with the user's current device). In some embodiments, the better service offer is with a different service provider. In some embodiments, the application provides information about the better service offer to the user through the device UI (e.g., by presenting information through a display, by providing an audible notification, etc.). In some embodiments, the application accepts a user indication that user wishes to accept the better service offer, and accepts billing information. In some embodiments, the application communicates that the user wishes to accept the service offer and billing information to a network element. In some embodiments, the network element is on the current service provider's network. In some embodiments, the network element is on the new service provider's network (i.e., the network operated by the service provider making the service offer that the user wishes to accept). In some embodiments, the network element is on a third-party network that is not owned by either the current service provider or the new service provider (e.g., the network element is on an independent agent/broker network). In some embodiments, the network element initiates the shipment of a new device (e.g., a new device providing the better service offer is sent or made available to the user). In some embodiments, when the user receives the new device, the user can either initiate number porting from an application that runs during initial device set up or via the one or more device agents on the new device.

In some embodiments, the user can enter the information to port a phone number through a website (either prior to activating service or once service is activated). In some embodiments, where the information is entered using a website, the one or more device agents are automatically triggered by a message communicated over the wireless network by a network element to initiate the number port (e.g., SMS message, USSD message, application push message (Google Cloud Messaging (GCM), Apple Push Notification Service (APNS), etc.)). In some embodiments, the one or more device agents assist in prompting the user to confirm the port request. In some embodiments, the port is initiated automatically in the background with no user intervention. In some embodiments, where the user enters the porting information through a website, the one or more device agents present the porting information through the device UI and at least assist in querying the user to verify and/or edit the porting information on the mobile device prior to initiating the port.

What is claimed is:

1. A wireless device, comprising:
a user interface;
memory configured to store:
one or more credentials associated with the wireless device, the one or more credentials for authorizing the wireless device to use a wireless access network to access one or more services, and
a target credential; and
one or more processors configured to execute one or more machine-executable instructions that, when executed by the one or more processors, cause the one or more processors to:
obtain, through the user interface, an indication of a user request to replace a particular credential of the one or more credentials with the target credential,
detect a network-provisioning state change, and
based on the detected network-provisioning state change, automatically
determine that the particular credential does not match the target credential,
initiate a programming session with a network element communicatively coupled to the wireless device over the wireless access network,
obtain an updated credential from the network element, and
assist in storing, in memory, the updated credential as the particular credential.

2. The wireless device recited in claim 1, wherein, when executed by the one or more processors, the one or more machine-executable instructions further cause the one or more processors to:
determine that the updated credential does not match the target credential, and
based on the determination that the updated credential does not match the target credential, take an action.

3. The wireless device recited in claim 2, wherein the action is to communicate with the network element.

4. The wireless device recited in claim 2, wherein the action is to cause a notification to be presented through the user interface, wherein the notification reports an error.

5. The wireless device recited in claim 2, wherein the action is to cause a notification to be presented through the user interface, wherein the notification reports that a procedure is in progress or has not been completed.

6. The wireless device recited in claim 2, wherein the action is to at least assist in restricting communications by the wireless device over the wireless access network.

7. The wireless device recited in claim 1, wherein, when executed by the one or more processors, the one or more machine-executable instructions further cause the one or more processors to:
determine that the updated credential matches the target credential, and based on the determination that the updated credential matches the target credential, take an action.

8. The wireless device recited in claim 7, wherein the action is to cause a notification to be presented through the user interface, wherein the notification reports that the particular credential has been replaced by the target credential.

9. The wireless device recited in claim 1, wherein, when executed by the one or more processors, the one or more machine-executable instructions further cause the one or more processors to cause a notification to be presented through the user interface, the notification providing information about a status of the user request to replace the particular credential of the one or more credentials with the target credential.

10. The wireless device recited in claim 1, wherein, when executed by the one or more processors, the one or more machine-executable instructions further cause the one or more processors to cause a notification to be presented through the user interface, the notification requesting confirmation of the user request to replace the particular credential with the target credential.

11. The wireless device recited in claim 1, wherein detecting the network-provisioning state change comprises determining that a registration attempt initiated by the wireless device has failed.

12. The wireless device recited in claim 1, wherein detecting the network-provisioning state change comprises determining that an attempt by the wireless device to place a voice call has failed.

13. The wireless device recited in claim 1, wherein detecting the network-provisioning state change comprises determining that an attempt by the wireless device to send a text message has failed.

14. The wireless device recited in claim 1, wherein detecting the network-provisioning state change comprises determining that an attempt by the wireless device to authenticate with the network element has failed.

15. The wireless device recited in claim 1, wherein detecting the network-provisioning state change comprises determining that an attempt by the wireless device to be authorized for a service has failed.

16. The wireless device recited in claim 1, wherein detecting the network-provisioning state change comprises determining that a network access error has occurred.

17. The wireless device recited in claim 1, wherein detecting the network-provisioning state change comprises receiving a provisioning-state-change message.

18. The wireless device recited in claim 17, wherein the provisioning-state-change message comprises a text message.

19. The wireless device recited in claim 17, wherein the provisioning-state-change message comprises a push message from a push server communicatively coupled to the wireless device over the wireless access network.

20. The wireless device recited in claim 17, wherein the provisioning-state-change message comprises a message received by an application program on the wireless device.

21. The wireless device recited in claim 1, wherein the one or more credentials comprise a phone number.

22. The wireless device recited in claim 1, wherein the one or more credentials comprise an international mobile subscriber identifier (IMSI), a mobile station identifier (MSID), a mobile station international ISDN number (MSISDN), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a mobile directory number (MDN), a network access identifier (NAI), a user name, a password, access point name (APN) configuration information, an encryption key (Ki), a Wi-Fi service set identifier (SSID), a Wi-Fi network configuration, an IP address, or a combination of these.

23. The wireless device recited in claim 1, wherein the target credential comprises a phone number.

24. The wireless device recited in claim 1, wherein the target credential comprises an international mobile subscriber identifier (IMSI), a mobile station identifier (MSID), a mobile station international ISDN number (MSISDN), a subscriber information module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, a mobile directory number (MDN), a network access identifier (NAI), a user name, a password, access point name (APN) configuration information, an encryption key (Ki), a Wi-Fi service set identifier (SSID), a Wi-Fi network configuration, an IP address, or a combination of these.

25. The wireless device recited in claim 1, wherein the particular credential comprises a first phone number currently associated with the wireless device, and wherein the target credential comprises a second phone number.

26. The wireless device recited in claim 25, wherein the wireless device is a first wireless device, and wherein the second phone number is, prior to the user request to replace the particular credential with the target credential, associated with a second wireless device.

27. The wireless device recited in claim 25, wherein the second phone number is, prior to the user request to replace the particular credential with the target credential, associated with a land line.

28. The wireless device recited in claim 1, wherein the user interface comprises a display.

29. The wireless device recited in claim 1, wherein the user interface comprises a speaker.

30. The wireless device recited in claim 1, wherein the one or more services comprise a voice service, a messaging service, or a data service.

31. The wireless device recited in claim 1, wherein the one or more machine-executable instructions comprise an application program.

32. The wireless device recited in claim 1, wherein the one or more machine-executable instructions comprise an operating system (OS) component, an OS function, an OS service, a modem programming agent, a modem software or firmware agent, an over-the-air (OTA) mobile device parameter programming agent, an Open Mobile Alliance (OMA) agent, a secure communication agent configured to communicate number porting and number provisioning information, a software agent, a firmware agent, or a combination of these.

33. The wireless device recited in claim 1, wherein the user request comprises an indication of the target credential, a phone number, a user name, a password, an account number, a subscriber name, a company name, at least a portion of a billing address, at least a portion of a social security number, a personal identification number (PIN), or a combination of these.

34. The wireless device recited in claim 1, wherein obtaining the indication of the user request to replace the particular credential of the one or more credentials with the target credential comprises obtaining information from a website.

35. The wireless device recited in claim 1, wherein obtaining the indication of the user request to replace the particular credential of the one or more credentials with the target credential comprises obtaining information associated with the user request through the user interface.

36. The wireless device recited in claim 1, wherein the network element comprises a programming server.

37. The wireless device recited in claim 1, wherein initiating the programming session with the network element communicatively coupled to the wireless device over the wireless access network comprises contacting the network element using at least a portion of the one or more credentials associated with the wireless device.

38. The wireless device recited in claim 1, wherein initiating the programming session with the network element communicatively coupled to the wireless device over the wireless access network comprises contacting the network element using a temporary credential.

39. The wireless device recited in claim 38, wherein, when executed by the one or more processors, the one or more machine-executable instructions further cause the one or more processors to obtain the temporary credential from memory.

40. The wireless device recited in claim 38, wherein, when executed by the one or more processors, the one or more machine-executable instructions further cause the one or more processors to obtain the temporary credential from a network system communicatively coupled to the wireless device.

41. The wireless device recited in claim 1, wherein initiating the programming session with the network element communicatively coupled to the wireless device over the wireless access network comprises contacting the network element using a default credential.

42. The wireless device recited in claim 1, wherein initiating the programming session with the network element communicatively coupled to the wireless device over the wireless access network comprises communicating with the network element over the wireless access network.

43. The wireless device recited in claim 1, wherein initiating the programming session with the network element communicatively coupled to the wireless device over the wireless access network comprises communicating with the network element over a Wi-Fi network.

44. The wireless device recited in claim 1, wherein initiating the programming session with the network element communicatively coupled to the wireless device over the wireless access network comprises communicating with the network element through a voice call.

45. The wireless device recited in claim 1, wherein, when executed by the one or more processors, the one or more machine-executable instructions further cause the one or more processors to at least assist in restricting communications over the wireless access network until the updated credential has been obtained.

46. The wireless device recited in claim 1, wherein the target credential comprises a configuration state indicator.

47. A non-transitory computer-readable storage medium storing one or more machine-executable instructions that, when executed by one or more processors of a wireless device, cause the one or more processors to:
 obtain, through a user interface, an indication of a user request to replace a particular credential of one or more credentials, for authorizing the wireless device to use a wireless access network to access one or more services, with a target credential;
 detect a network-provisioning state change; and
 based on the detected network-provisioning state change,
  automatically determine that the particular credential does not match the target credential,
  initiate a programming session with a network element communicatively coupled to the wireless device over a wireless access network,
  obtain an updated credential from the network element, and
  assist in storing, in memory, the updated credential as the particular credential.

48. The wireless device of claim 1, wherein the memory configured to store the one or more credentials comprises a protected memory that does not allow direct user modification of the particular credential.

* * * * *